US012764209B2

(12) United States Patent
Kim et al.

(10) Patent No.: US 12,764,209 B2
(45) Date of Patent: Oct. 13, 2026

(54) ELECTRONIC DEVICE WITH TRAY INCLUDING BODY, CONNECTION MEMBER, AND PIVOTABLE COVER FOR SIM OR SD CARD

(71) Applicant: SAMSUNG ELECTRONICS CO., LTD., Suwon-si (KR)

(72) Inventors: Sanghyeon Kim, Suwon-si (KR); Ohhee Lee, Suwon-si (KR); Bongjo Choi, Suwon-si (KR); Junmin Ji, Suwon-si (KR); Dongjin Seo, Suwon-si (KR); Soogyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 18/076,631

(22) Filed: Dec. 7, 2022

(65) Prior Publication Data

US 2023/0179692 A1 Jun. 8, 2023

Related U.S. Application Data

(63) Continuation of application No. PCT/KR2022/019722, filed on Dec. 6, 2022.

(30) Foreign Application Priority Data

Dec. 7, 2021 (KR) ........................ 10-2021-0173355

(51) Int. Cl.
*H04M 1/00* (2006.01)
*H04M 1/02* (2006.01)

(52) U.S. Cl.
CPC .................................. *H04M 1/026* (2013.01)

(58) Field of Classification Search
CPC ...... H04M 1/026; H04M 1/02; H04M 1/0274; G06K 13/0831; G06K 13/0868; G06K 19/00; G06K 19/005; H04B 1/3818
See application file for complete search history.

(56) References Cited

U.S. PATENT DOCUMENTS 8,976,521 B2 3/2015 Liu et al.
10,719,752 B2 7/2020 Zeng
(Continued)

FOREIGN PATENT DOCUMENTS

CN 104300321 B 10/2016
JP 3760000 B2 2/1998
(Continued)

OTHER PUBLICATIONS

International Search Report dated Mar. 16, 2023 for PCT/KR2022/019722.
(Continued)

*Primary Examiner* — Pakee Fang
(74) *Attorney, Agent, or Firm* — Nixon & Vanderhye P.C.

(57) ABSTRACT

An electronic device may include: a housing including an opening; a circuit board disposed in the housing; a socket disposed on the circuit board; and a tray to be inserted into the socket. The tray may include: a body including an accommodation space; a connection member disposed adjacent to the body and including a first fixing region and a second fixing region spaced apart from the first fixing region; and a cover including a support portion for shielding the opening and an operation portion formed adjacent to the support portion, and coupled to the connection member to be pivotable between a first position and a second position. The operation portion may include a fixing portion in at least part thereof, the fixing portion may be disposed in the first fixing region at the first position and in the second fixing region at the second position, and when an external force is applied to the support portion at the first position, at least part of the operation portion may be movable from the first fixing region to the second fixing region in contact with at least part of the connection member.

19 Claims, 33 Drawing Sheets

(56) References Cited

U.S. PATENT DOCUMENTS

| | | | | |
|---|---|---|---|---|
| 2004/0082210 | A1* | 4/2004 | Wallace | H04M 1/0274 439/152 |
| 2006/0057892 | A1* | 3/2006 | Bricaud | G06K 13/0875 439/630 |
| 2011/0188224 | A1* | 8/2011 | Sugai | H04M 1/026 174/541 |
| 2013/0044438 | A1 | 2/2013 | Tang | |
| 2013/0115796 | A1 | 5/2013 | Liu et al. | |
| 2015/0022981 | A1 | 1/2015 | Tan et al. | |
| 2015/0245515 | A1* | 8/2015 | Baek | H05K 5/0221 361/679.4 |
| 2016/0360631 | A1 | 12/2016 | Tan et al. | |
| 2017/0102742 | A1* | 4/2017 | Kim | H04B 1/3816 |
| 2018/0183181 | A1 | 6/2018 | Kim et al. | |
| 2018/0330215 | A1 | 11/2018 | Zeng | |

FOREIGN PATENT DOCUMENTS

| | | | |
|---|---|---|---|
| JP | 2014-007094 | A | 1/2014 |
| JP | 2014-007094 | A2 | 1/2014 |
| KR | 10-2015-0099346 | A | 8/2015 |
| KR | 10-2016-0090738 | A | 8/2016 |
| KR | 10-2017-0042148 | | 4/2017 |
| KR | 10-2017-0042148 | A | 4/2017 |
| KR | 10-2019-0125767 | A | 11/2019 |
| WO | WO 2015/085596 | A1 | 6/2015 |

OTHER PUBLICATIONS

PCT Written Opinion dated Mar. 16, 2023 for PCT/KR2022/019722.

Extended European Search Report dated Nov. 18, 2024 for EP Application No. 22904630.5.

Korean Office Action dated Jul. 28, 2025 for KR Application No. 10-2021-0173355.

Korean Written Decision on Registration dated Mar. 16, 2026 issued in Korean Patent Application No. 10-2021-0173355 and English translation, 10 pp.

* cited by examiner

ELECTRONIC DEVICE WITH TRAY INCLUDING BODY, CONNECTION MEMBER, AND PIVOTABLE COVER FOR SIM OR SD CARD

CROSS-REFERENCE TO RELATED APPLICATIONS

This application is a continuation of International Application No. PCT/KR2022/019722 designating the United States, filed on Dec. 6, 2022, in the Korean Intellectual Property Receiving Office and claiming priority to Korean Patent Application No. 10-2021-0173355, filed on Dec. 7, 2021, in the Korean Intellectual Property Office, the disclosures of which are all hereby incorporated by reference herein in their entireties.

BACKGROUND

Field

The disclosure relates to a tray and an electronic device including the same.

Description of Related Art

Along with the development of electronics, information, and communication technologies, various functions are integrated into one electronic device. For example, a smartphone includes functions such as an audio player, a photographing device, or an electronic note as well as a communication function. More various functions may be implemented in the smartphone by additionally installing applications. An electronic device may receive various pieces of information in real time by wiredly or wirelessly accessing a server or another electronic device as well as by executing a loaded application or a stored file.

As various functions are integrated in a single electronic device and electronic devices are miniaturized, a user may use an electronic device, while carrying it in daily living. According to this trend, manufacturers are competing to manufacture small-sized electronic devices with higher performance.

A portable electronic device may include a storage medium such as a user authentication module card or a memory card. Such a storage medium may be built into the electronic device itself or configured to be easily replaced and/or added by a user. For example, the electronic device may include a tray detachable from a housing, and the storage medium may be mounted on the electronic device and/or the housing while being disposed on the tray.

The user may use a separate member (e.g., a tray ejector pin) in detaching the tray from the electronic device. In addition, the electronic device needs to provide an internal space for accommodating the separate member used to detach the tray. However, this may reduce the user's convenience, and the internal space efficiency of the electronic device may also decrease.

SUMMARY

In this regard, according to various embodiments of the disclosure, a tray which is attachable and detachable by a simple manipulation without the need for a separate member and thus increases user convenience, and an electronic device including the same may be provided.

The problems to be solved in the disclosure are not limited to the above one, and may be variously extended without departing from the spirit and scope of the disclosure.

According to various example embodiments, an electronic device may be provided, which may include: a housing including an opening; a circuit board disposed in the housing; a socket disposed on, directly or indirectly, the circuit board; and a tray to be inserted into the socket. The tray may include: a body including an accommodation space; a connection member disposed adjacent to, directly or indirectly, the body and including a first fixing region and a second fixing region spaced apart from the first fixing region; and a cover including a support portion for shielding the opening and an operation portion formed adjacent to, directly or indirectly, the support portion, and coupled to the connection member to be pivotable between a first position and a second position. The operation portion may include a fixing portion in at least part thereof, the fixing portion may be disposed in the first fixing region at the first position and in the second fixing region at the second position, and when an external force is applied to the support portion at the first position, at least part of the operation portion may be movable from the first fixing region to the second fixing region in contact with at least part of the connection member.

According to various example embodiments, a tray insertable into an electronic device may be provided, including: a body including an accommodation space for accommodating a storage medium, and forming an exterior of the tray; a connection member disposed at an edge of one side of the body; and a cover operably coupled to the connection member. The cover may include: an opening for accommodating at least part of the connection member; a support portion; and an operation portion formed adjacent to, directly or indirectly, the support portion and including a protrusion. The connection member may include a first fixing region and a second fixing region, formed as at least one concave portion. The protrusion may be located in the first fixing region at a first position of the cover, and when an external force is applied to the support portion, the cover may rotate from the first position to a second position, and the protrusion is moved on at least part of the connection member from the first fixing region to the second fixing region.

According to various embodiments, user convenience related to tray attachment and detachment may be increased by providing a tray including a cover pivotable to protrude outward from an electronic device.

BRIEF DESCRIPTION OF THE DRAWINGS

FIG. 22 is an exploded perspective view illustrating the tray according to the third example embodiment.

FIG. 23 is a top view illustrating the tray according to the third example embodiment.

FIG. 24 is an enlarged view illustrating a connection member according to the third example embodiment.

DETAILED DESCRIPTION

Figure 1:
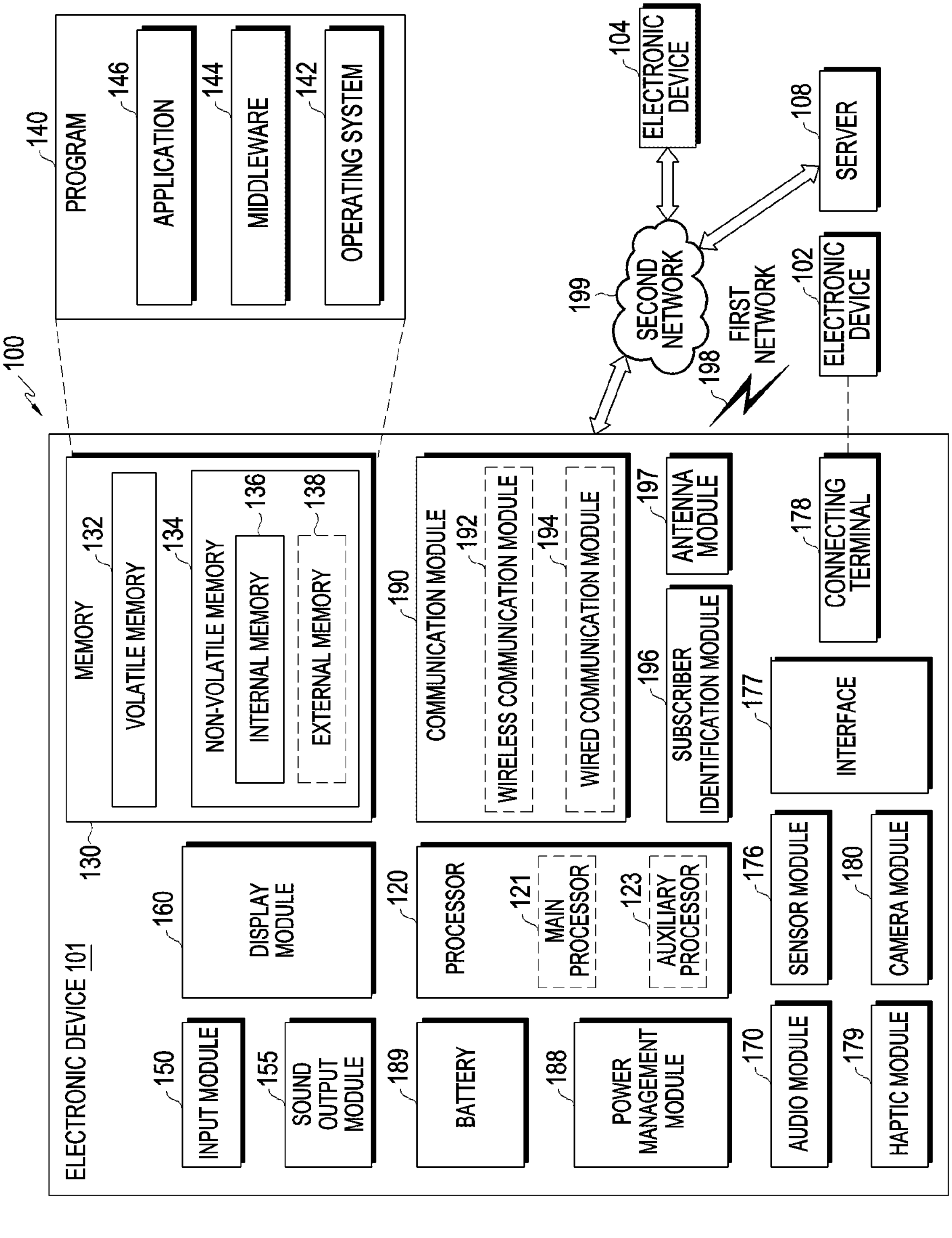
FIG. 1 is a block diagram illustrating an electronic device in a network environment according to various example embodiments.

FIG. 1 is a block diagram illustrating an electronic device in a network environment according to various embodiments. Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, antenna module 197 may include an antenna including a radiating element composed of a conductive material or a conductive pattern formed in or on a substrate (e.g., a printed circuit board (PCB)). According to an embodiment, antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "connected to", or "connected to" another element (e.g., a second element), it means that the element may be coupled with the other element directly (e.g., wiredly), wirelessly, or via at least a third element.

As used in connection with various example embodiments, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
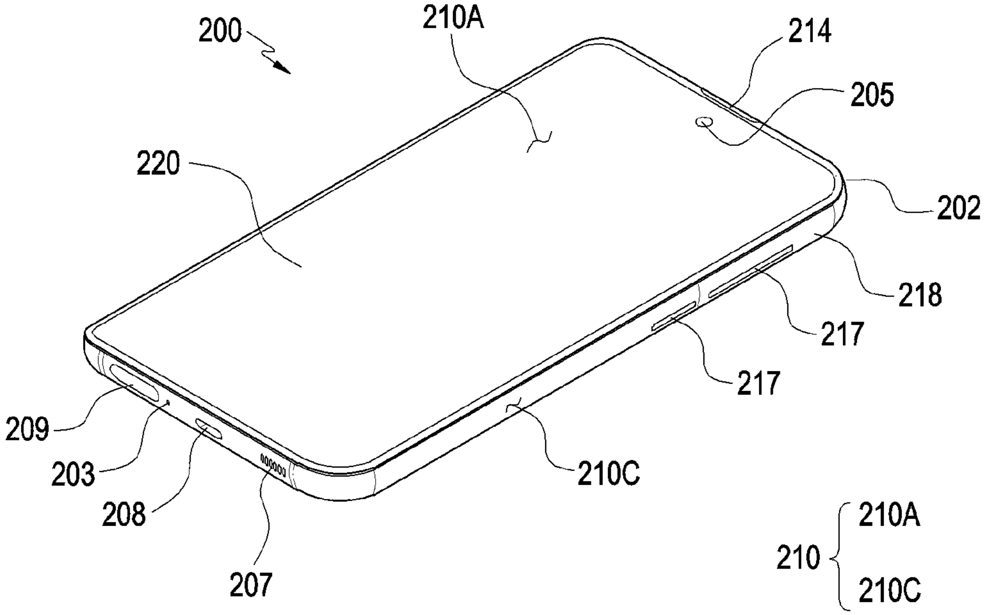
FIG. 2 is a front perspective view illustrating an electronic device according to various example embodiments.
Figure 3:
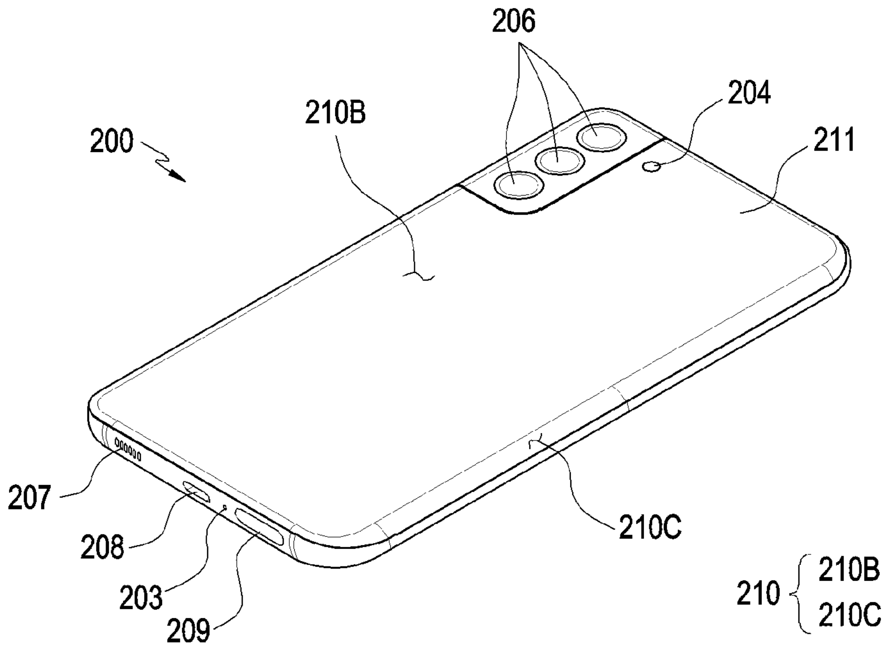
FIG. 3 is a rear perspective view illustrating an electronic device according to various example embodiments.

FIG. 2 is a front perspective view illustrating an electronic device according to various example embodiments. FIG. 3 is a rear perspective view illustrating the electronic device according to various example embodiments.

Referring to FIGS. 2 and 3, an electronic device 200 according to an embodiment may include a housing 210 which includes a front surface 210A, a rear surface 210B, and a side surface 210C surrounding a space between the front surface 210A and the rear surface 210B. In another embodiment (not shown), the housing 210 may refer to a structure that forms part of the front surface 210A of FIG. 2, the rear surface 210B of FIG. 3, and the side surface 210C. According to an embodiment, at least part of the front surface 210A may be formed by a front plate 202 (e.g., a glass plate or polymer plate including various coating layers) which is at least partially substantially transparent. The rear surface 210B may be formed by a rear plate 211. The rear plate 211 may be formed of, for example, glass, ceramic, a polymer, a metal (e.g., titanium (Ti), stainless steel (STS), or magnesium (Mg)), or a combination of at least two of these materials. The side surface 210C may be coupled with the front plate 202 and the rear plate 211 and formed by a side bezel structure (or "side member") 218 including a metal and/or a polymer. In some embodiments, the rear plate 211 and the side bezel structure 218 may be integrally formed and include the same material (e.g., glass, a metallic material such as aluminum, or ceramic). In another embodiment, the front surface 210A and/or the front plate 202 may include part of a display 220.

According to an embodiment, the electronic device 200 may include at least one of the display 220, audio modules 203, 207, and 214 (e.g., the audio module 170 of FIG. 1), a sensor module (e.g., the sensor module 176 of FIG. 1), camera modules 205 and 206 (e.g., the camera module 180 of FIG. 1), key input devices 217 (e.g., the input module 150 of FIG. 1), or connector holes 208 and 209 (e.g., the connecting terminal 178 of FIG. 1). In some embodiments, the electronic device 200 may not be provided with at least one (e.g., the connector hole 209) of the components or additionally include other components. According to an embodiment, the display 220 may be visually exposed, for example, through a substantial portion of the front plate 202.

According to an embodiment, a surface (or the front plate 202) of the housing 210 may include a view area formed by visual exposure of the display 220. For example, the view area may include the front surface 210A.

In another embodiment (not shown), the electronic device 200 may include a recess or an opening formed in part of the view area (e.g., the front surface 210A) of the display 220, and include at least one of the audio module 214, a sensor module (not shown), a light emitting element (not shown), or the camera module 205, which is aligned with the recess or the opening. In another embodiment (not shown), the electronic device 200 may include at least one of the audio module 214, the sensor module (not shown), the camera module 205, a fingerprint sensor (not shown), or the light emitting element (not shown) on the rear surface of the view area of the display 220.

In another embodiment (not shown), the display 220 may be incorporated with or disposed adjacent to a touch sensing circuit, a pressure sensor that measures the intensity (pressure) of a touch, and/or a digitizer that detects a magnetic field-based stylus pen.

In some embodiments, at least some of the key input devices 217 may be disposed in the side bezel structure 218.

According to an embodiment, the audio modules 203, 207, and 214 may include, for example, a microphone hole 203 and speaker holes 207 and 214. A microphone for obtaining an external sound may be disposed in the microphone hole 203, and in some embodiments, a plurality of microphones may be disposed to detect the direction of a sound. The speaker holes 207 and 214 may include an external speaker hole 207 and a receiver hole 214 for calls. In some embodiments, the speaker holes 207 and 214 and the microphone hole 203 may be implemented as a single hole, or a speaker (e.g., a piezo speaker) may be included without the speaker holes 207 and 214.

According to an embodiment, the sensor module (not shown) may detect an internal operation state or external environmental state of the electronic device 200 and generate an electrical signal or data value corresponding to the detected state. The sensor module (not shown) may include, for example, a first sensor module (not shown) (e.g., a proximity sensor) and/or a second sensor module (not shown) (e.g., a fingerprint sensor), disposed on the front surface 210*a*. The sensor module (not shown) may include, for example, a third sensor module (not shown) (e.g., a hear rate monitor (HRM) sensor) and/or a fourth sensor module (not shown) (e.g., a fingerprint sensor), disposed on the rear surface 210B. In some embodiments (not shown), the fingerprint sensor may be disposed on the rear surface 210*b* as well as on the front surface 210*a* (e.g., the display 220). The electronic device 200 may further include a sensor module (not shown), for example, at least one of a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor (not shown).

According to an embodiment, the camera modules 205 and 206 may include, for example, a front camera module 205 disposed on the front surface 210A of the electronic device 200, and a rear camera module 206 and/or a flash 204 disposed on the rear surface 210B of the electronic device 200. Each of the camera modules 205 and 206 may include one or more lenses, an image sensor, and/or an image signal processor. The flash 204 may include, for example, a light emitting diode (LED) or a xenon lamp. In some embodiments, two or more lenses (an IR camera, a wide-angle lens, and a telephoto lens) and image sensors may be arranged on one surface of the electronic device 200.

According to an embodiment, the key input devices 217 may be arranged on the side surface 210C of the housing 210. In another embodiment, the electronic device 200 may not include some or any of the above key input devices 217, and the key input devices 217 which are not included may be implemented in other forms such as soft keys on the display 220.

According to an embodiment, the light emitting element (not shown) may be disposed, for example, on the front surface 210A of the housing 210. The light emitting element (not shown) may provide, for example, state information about the electronic device 200 in the form of light. In another embodiment, the light emitting element (not shown) may provide, for example, a light source interworking with an operation of the front camera module 205. The light emitting element (not shown) may include, for example, an LED, an IR LED, and/or a xenon lamp.

According to an embodiment, the connector holes 208 and 209 may include a first connector hole 208 that may accommodate a connector (e.g., a universal serial bus (USB) connector) for transmitting and receiving power and/or data to and from an external electronic device and a connector (e.g., an earphone jack) for transmitting and receiving an audio signal to and from an external electronic device, and/or a second connector hole 209 for accommodating a storage device (e.g., a subscriber identity module (SIM) card). According to an embodiment, the connector holes 208 and 209 may be omitted.

Figure 4:
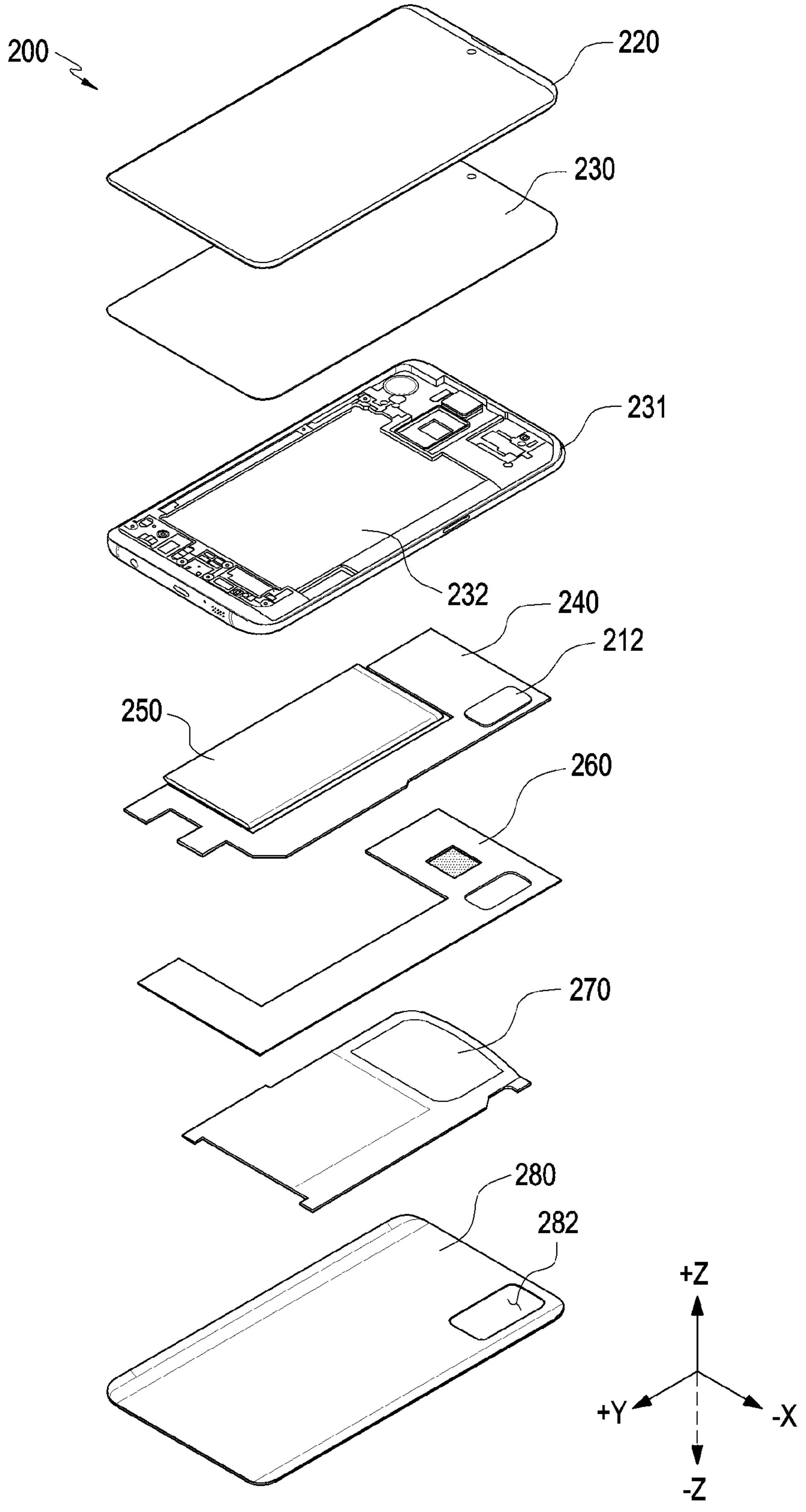
FIG. 4 is an exploded perspective view illustrating an electronic device according to various example embodiments.

FIG. 4 is an exploded perspective view illustrating an electronic device according to various example embodiments.

Referring to FIG. 4, the electronic device 200 (e.g., the electronic device 200 of FIGS. 2 and 3) may include at least one of a front plate 220 (e.g., the front plate 202 of FIG. 2), a display 230 (e.g., the display 220 of FIG. 2), a first support member 232 (e.g., a bracket), a printed circuit board (PCB) 240, a battery 250, a second support member 260 (e.g., a rear case), an antenna 270, or a rear plate 280 (e.g., the rear plate 211 of FIG. 3). In some embodiments, the electronic device 200 may not be provided with at least one (e.g., the first support member 232 or the second support member 260) of the components or further include other components. At least one of the components of the electronic device 200 may be the same as or similar to at least one of the components of the electronic device 200 illustrated in FIG. 2 or FIG. 3, and a redundant description will be avoided herein.

According to an embodiment, the first support member 232 may be disposed inside the electronic device 200 and coupled to a side bezel structure 231 or integrally formed with the side bezel structure 231. The first support member 232 may be formed of, for example, a metallic material and/or a non-metallic material (e.g., polymer). The first support member 232 may have one surface coupled with the display 230 and the other surface coupled with the PCB 240. The PCB 240 may have a processor, a memory, and/or an interface mounted thereon. The processor may include, for example, at least one of a central processing unit (CPU), an application processor, a graphic processing device, an image signal processor, a sensor hub processor, or a communication processor. According to an embodiment, the memory may include, for example, a volatile memory or a non-volatile memory. According to an embodiment, the interface may include, for example, an HDMI, a USB interface, an SD card interface, and/or an audio interface. The interface may electrically or physically couple, for example, the electronic device 200 to an external electronic device, and may include a USB connector, an SD card/multimedia card (MMC) connector, or an audio connector. According to one embodiment, the battery 250 (e.g., the battery 189 of FIG. 1) is a device for supplying power to at least one component of the electronic device 200, and may include, for example, a non-rechargeable primary cell, a rechargeable secondary cell, or a fuel battery. At least a part of the battery 250 may be disposed on the substantially same plane with, for example, the PCB 240. The battery 250 may be integrally disposed inside the electronic device 200, or may be disposed detachably from the electronic device 200.

According to an embodiment, the second support member 260 (e.g., the rear case) may be disposed between the PCB 240 and the antenna 270. For example, the second support member 260 may include one surface coupled with at least one of the PCB 240 or the battery 250 and the other surface coupled with the antenna 270.

According to an embodiment, the antenna 270 may be disposed between the rear plate 280 and the battery 250. The antenna 270 may include, for example, a near field communication (NFC) antenna, a wireless charging antenna, and/or a magnetic secure transmission (MST) antenna. The antenna 270 may, for example, perform short-range communication with an external device or wirelessly transmit and receive power required for charging to and from an external device. For example, the antenna 270 may include a coil for wireless charging. In another embodiment, an antenna structure may be formed by a part of the side bezel structure 231 and/or the first support member 232 or a combination thereof.

According to various embodiments, the electronic device 200 may include a camera module (e.g., a camera module 206 of FIG. 3) disposed inside a housing (e.g., the housing 210 of FIG. 2). The camera module 212 may be a rear camera module (e.g., the camera module 212 of FIG. 3) which is disposed on the first support member 232, and may obtain an image of an object located behind the electronic device 200 (e.g., in a +Z direction). According to an embodiment, at least a part of the camera module 212 may be exposed to the outside of the electronic device 200 through an opening 282 formed in the rear plate 280.

The electronic device 200 illustrated in FIGS. 2, 3 and 4 has a bar-type or plate-type outward appearance, which should not be construed as limiting the disclosure. For example, the illustrated electronic device may be a rollable electronic device or a foldable electronic device. A "rollable electronic device" refers to an electronic device in which a display (e.g., the display 230 of FIG. 4) is bendable to be deformed and thus at least partially wound or rolled or accommodated into the housing (e.g., the housing 210 of FIG. 2). According to a user need, the rollable electronic device may extend a view area by unfolding the display or exposing a larger area of the display to the outside. A "foldable electronic device" may refer to an electronic device in which a display is foldable such that two different areas of the display face each other or in opposite directions. In general, the display may be folded with two different areas facing each other or in opposing directions in a portable state, whereas the user may unfold the display and make the two different areas substantially flat in an actual use state, in the foldable electronic device. In some embodiments, the electronic device 200 according to various example embodiments may include not only a portable electronic device such as a smartphone but also various other electronic devices such as a laptop computer or a camera.

Figure 5:
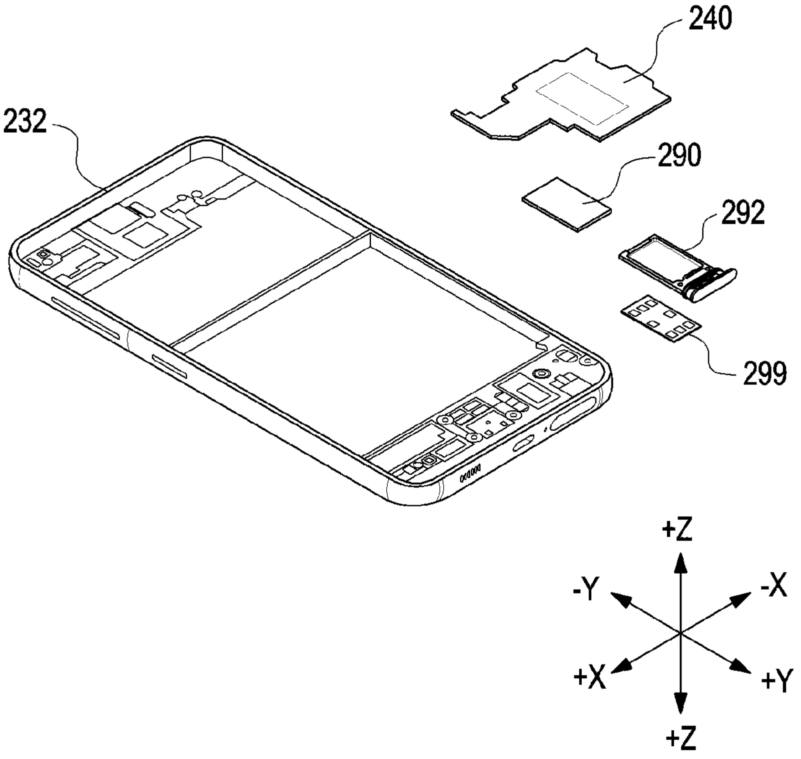
FIG. 5 is an exploded view illustrating a tray-socket structure included in the electronic device of FIG. 4.

FIG. 5 is an exploded view illustrating a tray-socket structure included in the electronic device of FIG. 4.

Referring to FIG. 5, an electronic device (e.g., the electronic device 200 of FIG. 4) may include a tray-socket structure. FIG. 5 illustrates part of the electronic device 200 of FIG. 4. However, the illustration of FIG. 5 focuses on the support member 232 and the PCB 240, without the remaining components (e.g., the battery) illustrated in FIG. 4, for convenience of description.

According to various embodiments, the electronic device (e.g., the electronic device 200 of FIG. 4) may include a tray 292 and/or a socket 290, so that a user may replace or add a storage medium 299 such as a user identification card or a memory card as needed. The tray 292 may provide a space and/or structure in which at least one storage medium 299 may be accommodated, and may be detachably accommodated in a housing (e.g., the housing 210 of FIG. 1 and/or FIG. 2).

According to an embodiment, the socket 290 may be disposed inside the housing (e.g., the housing 210 of FIG. 1 and/or FIG. 2) and accommodate and/or fix at least part of the tray 292. According to an embodiment, the socket 290 may be mounted on the PCB 240 and electrically coupled to at least some of the electrical/electronic components arranged on the PCB 240. For example, the storage medium 299 disposed on the tray 292 may be electrically coupled to the socket 290 and/or to the PCB 240 via the socket 290.

Figure 6A:
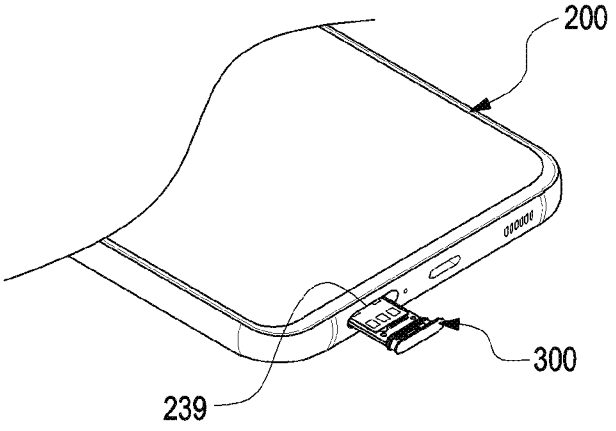
FIGS. 6(*a*)-(*c*) are diagrams illustrating a process of attaching a tray to and detaching the tray from an electronic device from the perspective of the outside of the electronic device according to various example embodiments.
Figure 6B:
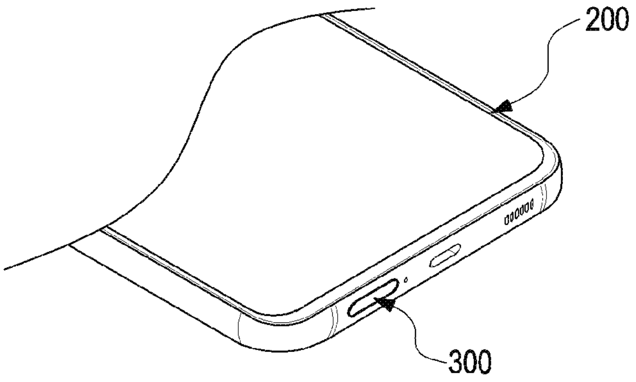
Figure 6C:
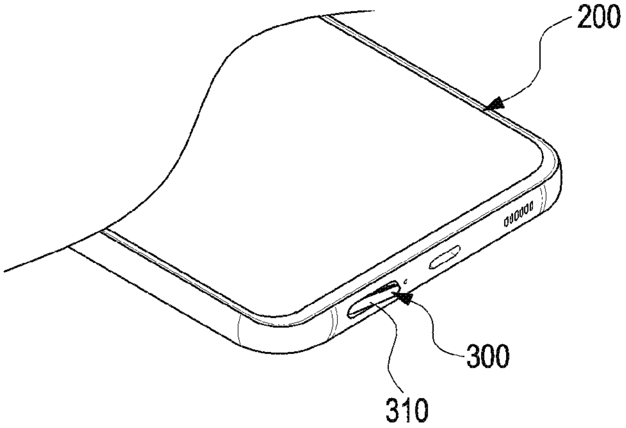
Figure 7A:
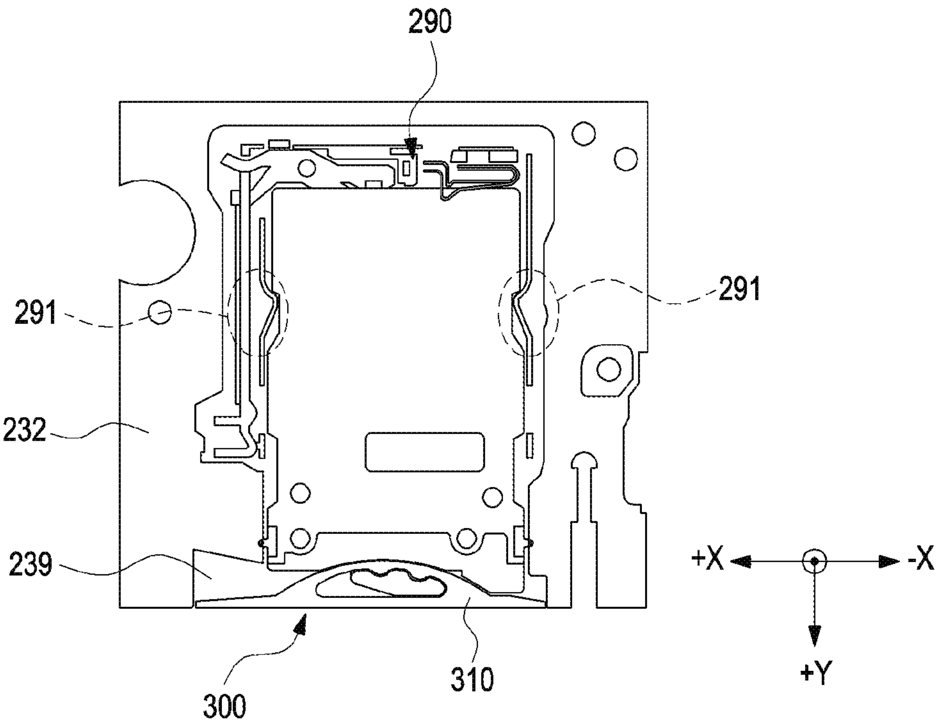
FIGS. 7(*a*)-(*b*) are diagrams illustrating a process of attaching a tray to and detaching the tray from an electronic device from the perspective of the inside of the electronic device according to various example embodiments.
Figure 7B:
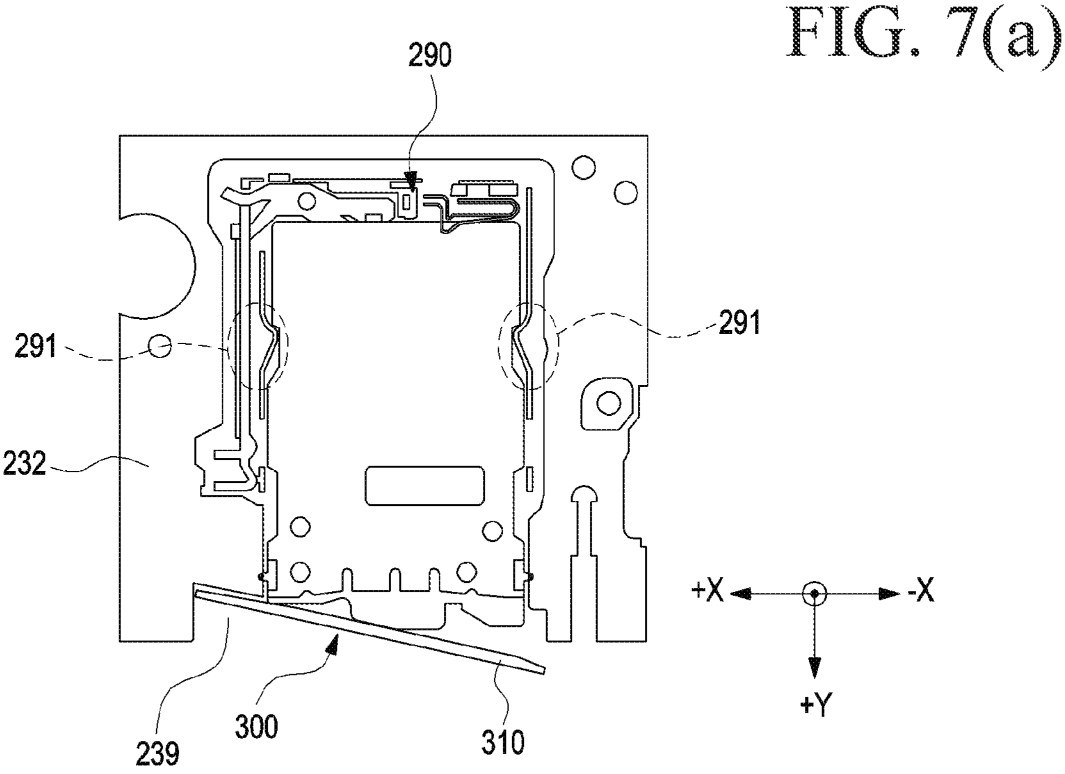

FIG. 6 is a diagram illustrating a process of attaching a tray to and detaching the tray from an electronic device from the perspective of the outside of the electronic device according to various embodiments. FIG. 7 is a diagram illustrating the process of attaching the tray to and detaching the tray from the electronic device from the perspective of the inside of the electronic device according to various embodiments.

Referring to FIGS. 6 and 7, a tray 300 may include a cover 310. The descriptions of the electronic device 200 and the tray 292 of FIGS. 2 to 5 may be applied adaptively to the electronic device 200 and the tray 300 of FIGS. 6 and 7, respectively.

According to various embodiments, the tray 300 may be detachably mounted in the electronic device 200. According to an embodiment (referring to FIGS. 6(*a*) and 6(*b*)), the tray 300 may be inserted and mounted into the electronic device 200 through an accommodation opening 239 (or an insertion opening). In the inserted and mounted state, the tray 300 may shield the opening formed in the support member 232 or the housing (e.g., the housing 210 of FIG. 2).

According to various embodiments (referring to FIG. 6(*c*)), the structure of the tray 300 may be changed to facilitate removal of the tray 300 from the electronic device 200. For example, when an external force is applied to the tray 300 which has been inserted into the electronic device 200 so that at least part of the cover 310 protrudes to the outside of the electronic device 200, the position (or posture) of the tray 300 may be changed. As the at least part of the cover 310 protrudes to the outside of the electronic device 200, user convenience may be increased. For example, the user may easily remove the tray 300 from the electronic device 200 by holding the protruding part.

According to various embodiments (referring to FIG. 7), the tray 300 may be mounted on the socket 290. According to an embodiment, the socket 290 may include a fixing elastic portion 291 for preventing separation of the tray 300. For example, when the tray 300 is mounted on the socket 290, a mounted position of the tray 300 may be fixed by an elastic force of the fixing elastic portion 291. According to an embodiment, when a force equal to or greater than the force of the fixing elastic portion 291 fixing the tray 300 is applied in a +Y-axis direction, the tray 300 may be removed to the outside of the socket 290 or the electronic device 200. For example, the user may remove the tray 300 from the electronic device 200 by applying a force greater than a force with which the fixing elastic portion 291 supports the tray 300 in a Y-axis direction (by pulling the tray), while holding the part of the cover 310 protruding to the outside of the electronic device 200. As such, the socket 290 according to various embodiments enables the user to easily remove the tray 300 even without a separate additional component (e.g., a tray ejector pin). In addition, as the socket 290 according to various embodiments does not require a separate additional structure (e.g., a pin hole) for removal of the tray 300, the socket 290 may be miniaturized and manufactured in a simple structure.

In the following description of the disclosure, a state in which no external force is applied to the tray 300, for example, a state in which the tray 300 is inserted into the electronic device 200 and close the accommodation opening 239 (e.g., FIG. 6(*b*)) may be referred to as an "initial state". In addition, a state in which an external force is applied to the tray 300 and thus the posture of the tray 300 is changed (e.g., FIG. 6(*c*)) may be referred to as an "open state". In addition, a state in which a portion (e.g., the cover (e.g., a support portion 311 of FIG. 11) of the tray 300 moves (or pivots) in contact with another portion (e.g., a connection member 330) of the tray 300 during switching of the tray 300 from the initial state (e.g., FIG. 6(*b*)) to the open state (e.g., FIG. 6(*c*)) may be referred to as a "slide state".

In the following description, in relation to a process in which the tray 300 according to various embodiments operates from the initial state to the open state, the coupling structures of various components included in the tray 300 will be described with reference to the drawings.

In describing embodiments with reference to the drawings, a tray and a coupling relationship between components included in the tray according to various embodiments may be illustrated. These components may be coupled with each other as protrusions and concave portions. They may be coupled to each other through various other serration structures. However, it should be noted that the spirit of the disclosure is not limited to the structures illustrated in the drawings. For example, the coupling structure between a protrusion and a concave portion illustrated in the drawings may be formed the other way around, and other coupling structures consistent with the spirit of the disclosure may be applied.

Figure 8:
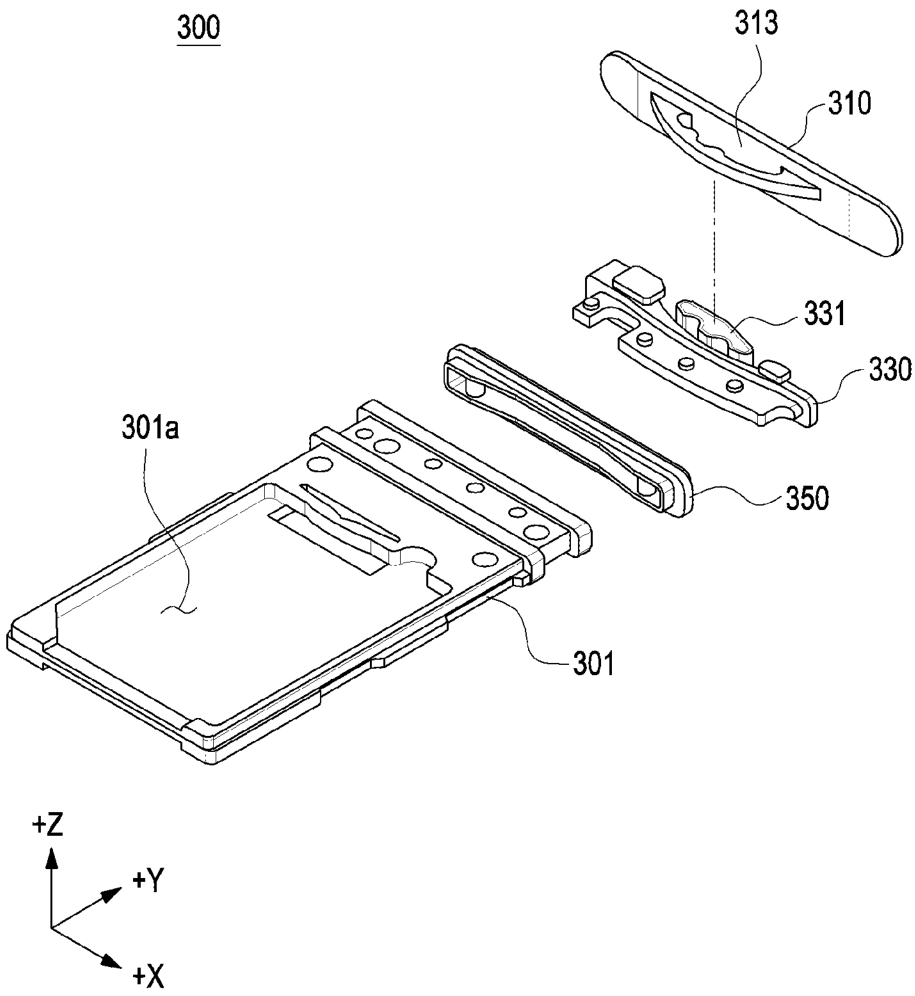
FIG. 8 is an exploded perspective view illustrating a tray according to various example embodiments.
Figure 9A:
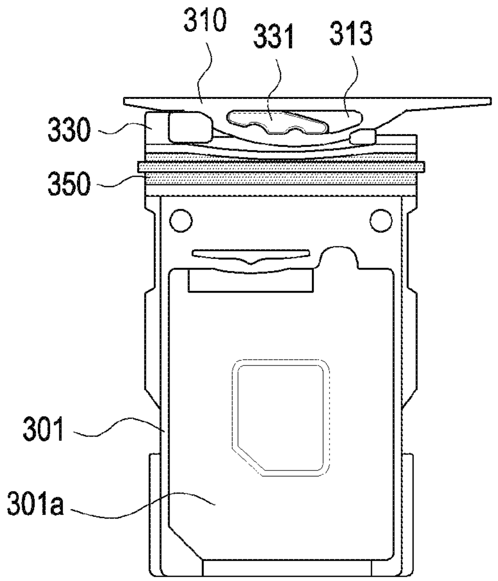
FIGS. 9(*a*)-(*b*) are diagrams illustrating the front and rear surfaces of a tray according to various example embodiments.
Figure 9B:
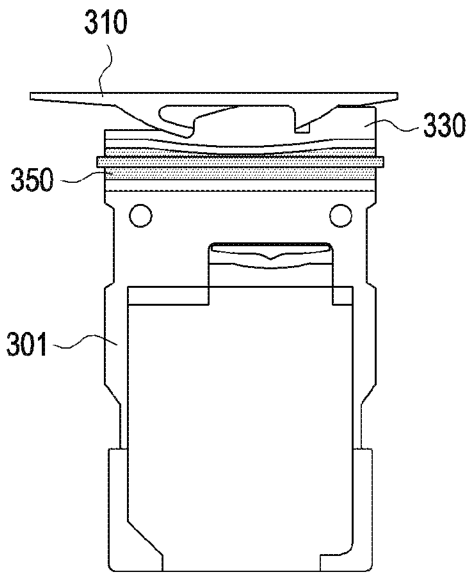

FIG. 8 is an exploded perspective view illustrating a tray according to various embodiments. FIG. 9 is a diagram illustrating the front and rear surfaces of the tray according to various embodiments.

Referring to FIGS. 8 and 9, the tray 300 may include a body 301, a connection member 330 disposed at an edge of one side (+Y-axis direction) of the body 301, an elastic member 350 disposed under (−Y-axis direction) the connection member 330, and the cover 310 coupled to the connection member 330.

According to various embodiments, the body 301 may form the overall exterior of the tray 300. According to an embodiment, the body 301 may include an accommodation space 301*a* (or an accommodation portion) in which a storage medium is to be located. For example, the accommodation space 301*a* may be formed as an opening or a concave portion in the body 301.

According to various embodiments, the connection member 330 may be disposed at the edge of the one side (+Y-axis direction) of the body 301. According to an embodiment, the connection member 330 may be formed of an elastic material. For example, the connection member 330 may be formed of at least one of urethane, rubber, or silicone. According to an embodiment, the connection member 330 may provide an elastic force and a restoring force to fix the position of the cover 310. However, the connection member (e.g., a connection member 1330 of FIGS. 29 to 32) may be formed of a metal material, as described later. For example, the connection member (e.g., the connection member 1330 of FIGS. 29 to 32) may include a spring, a clip, a pogo pin, or a plate.

According to various embodiments, an elastic member 350 may be disposed under the connection member 330. According to an embodiment, the elastic member 350 may be disposed to surround at least part of the body 301. According to an embodiment, the elastic member 350 may be formed of a material having strong surface friction and elasticity. For example, the elastic member 350 may include at least one of rubber or silicon. When the tray 300 is inserted into an electronic device (e.g., the electronic device 200 of FIG. 6), the elastic member 350 may be brought into close contact with an insertion opening (e.g., the accommodation opening 239 of FIG. 6) or a socket (e.g., the socket 290 of FIG. 7) and suppress introduction of moisture or a foreign material into the electronic device (e.g., the electronic device 200 of FIG. 6).

According to various embodiments, the cover 310 may be operably coupled to the connection member 330. For example, the cover 310 may rotate while coupled to the connection member 330. According to an embodiment, a connection portion 331, which is a portion of the connection member 330, may be accommodated in an opening 313 formed in the cover 310. According to an embodiment, the cover 310 may be changed in position while coupled to the connection member 330 according to application of an external force, and maintain a position in cooperation with the connection member 330. According to an embodiment, the shape of the cover 310 may correspond to the insertion opening (e.g., the accommodation opening 239 of FIG. 6). According to an embodiment, the material of the cover 310 may be a metal or a polymer. For example, the material of the cover 310 may correspond to that of a support member (e.g., the support member 232 of FIG. 4).

In the following description of the disclosure, an operation and a coupling structure between the connection member 330 and the cover 310 will be described below with reference to the drawings.

Figure 10:
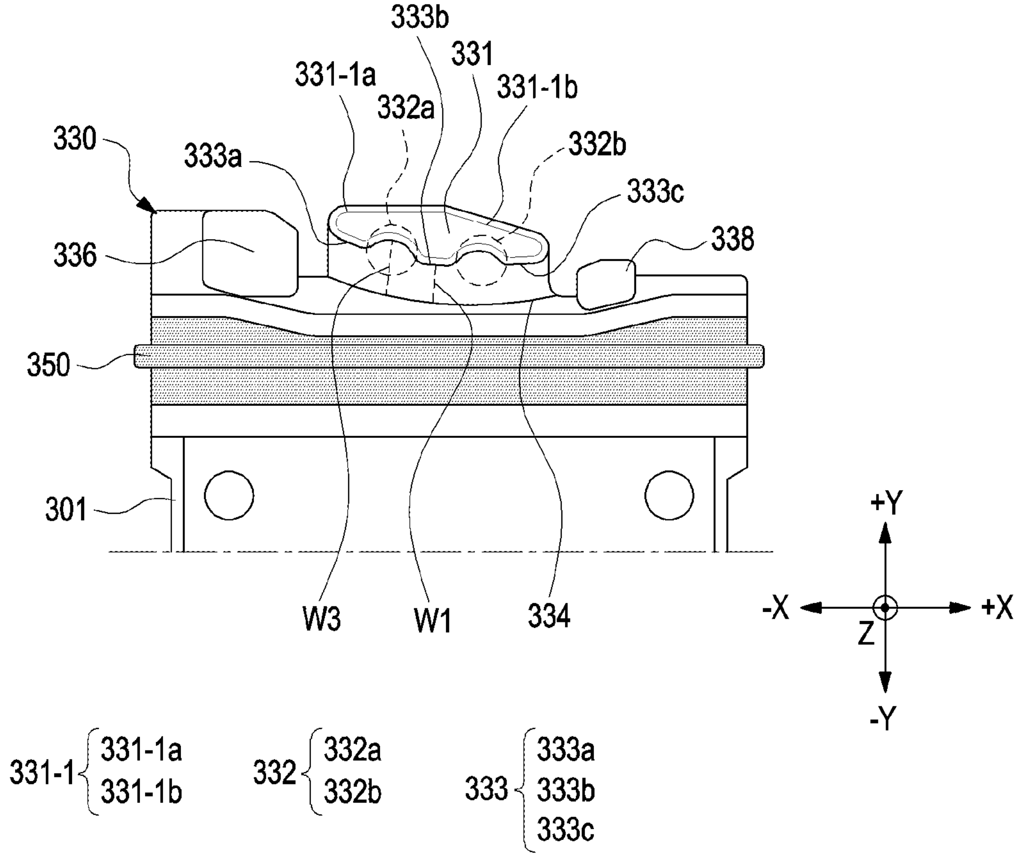
FIG. 10 is an enlarged view illustrating the part of a connection member in a tray according to various embodiments.
Figure 11:
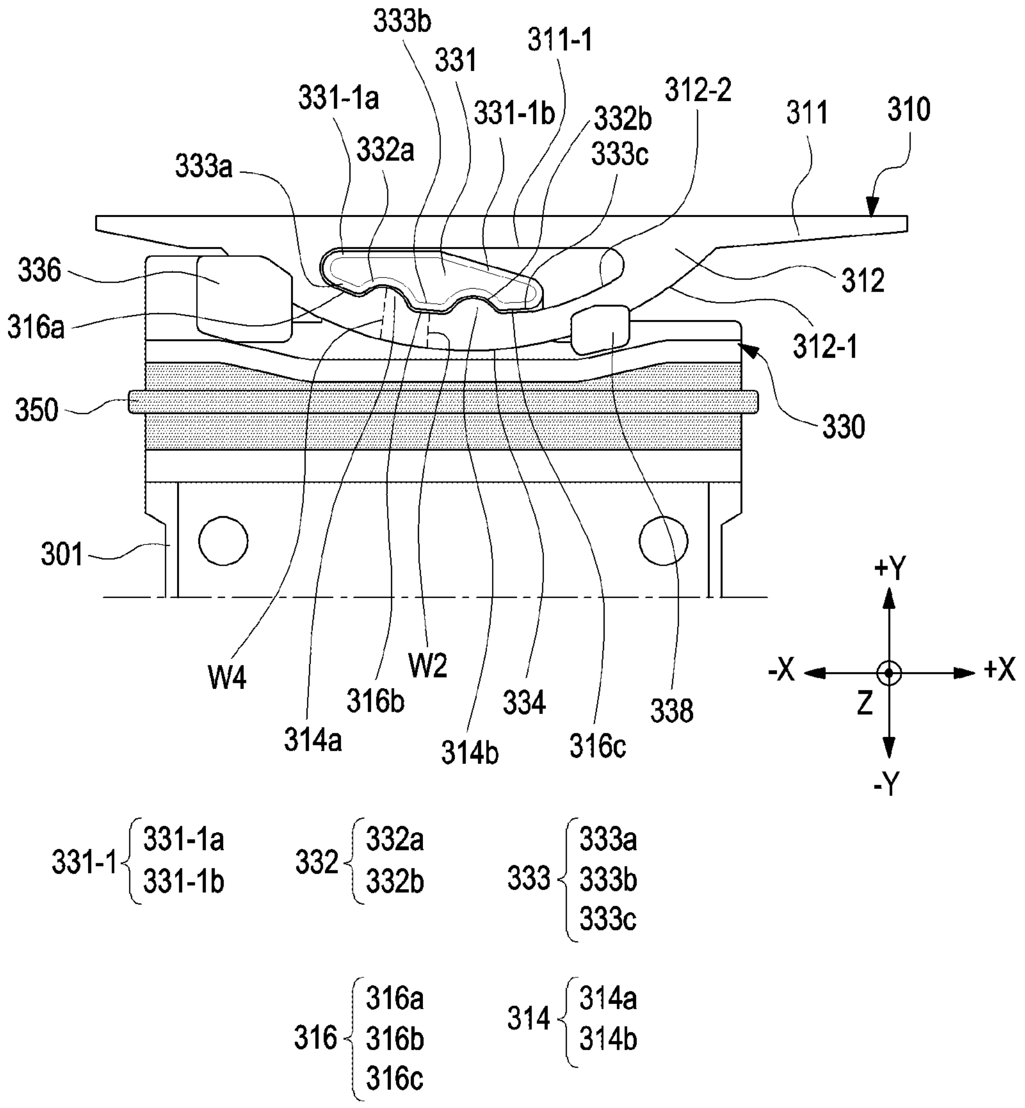
FIG. 11 is a diagram illustrating an initial state of a tray according to various example embodiments.
Figure 12:
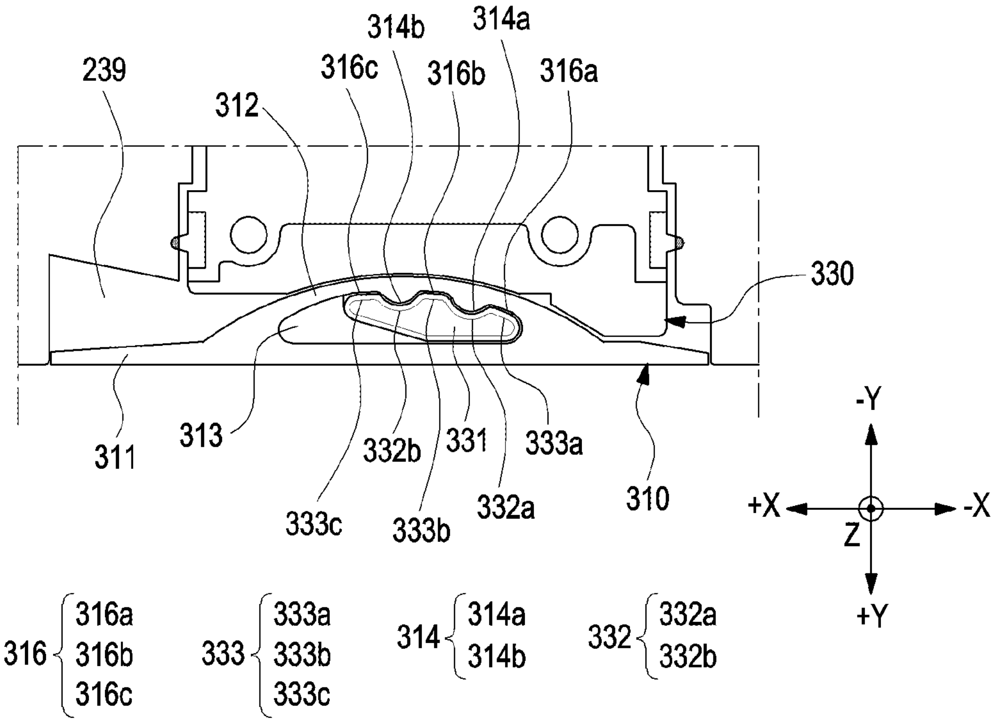
FIG. 12 is a diagram illustrating an initial state of a tray from the perspective of the inside of an electronic device according to various embodiments.

FIG. 10 is an enlarged view illustrating the part of a connection member in a tray according to various embodiments. FIG. 11 is a diagram illustrating the initial state of the tray according to various embodiments. FIG. 12 is a diagram illustrating the initial state of the tray in an electronic device from the perspective of the inside of the electronic device according to various embodiments.

Referring to FIGS. 10, 11 and 12, the connection member 330 may include the connection portion 331. The connection portion 331 may be operably coupled to the cover 310.

According to various embodiments, the connection portion 331 may include a fixing region 332. According to an embodiment, the fixing region 332 may include a first fixing region 332*a* and a second fixing region 332*b*. For example, the fixing region 332 may be formed to be concave in at least part of the connection portion 331. However, this is only an example, and the fixing region 332 may be formed as a protrusion. According to an embodiment, the fixing region 332 may accommodate at least part (e.g., a fixing portion 314) of the cover 310. As the fixing region 332 accommodates the at least part (e.g., the fixing portion 314) of the cover 310, the position (or posture) of the cover 310 may be maintained.

According to various embodiments, the connection portion 331 may include a support region 331-1. According to an embodiment, the support region 331-1 may include a first support region 331-1*a* and a second support region 331-1*b*. For example, when the tray 300 is in the initial state, the first support region 331-1*a* may support portion (e.g., a bottom surface (a −Y-axis direction surface 311-1) of the support portion 311) of the cover 310 (see FIG. 11), as described later. In another example, when the tray 300 is in the open state, the second support region 331-1*b* may support the part (e.g., the bottom surface (the −Y-axis direction surface 311-1) of the support portion 311) of the cover 310.

According to various embodiments, the connection portion 331 may include a contact region 333. According to an embodiment, the contact region 333 may include first, second and third contact regions 333*a*, 333*b*, and 333*c*. According to an embodiment, the contact region 333 may be formed adjacent to the fixing region 332. For example, the first contact region 333*a* and the second contact region 333*b* may be formed with the first fixing region 332*a* interposed therebetween, and the second contact region 333*b* and the third contact region 333*c* may be formed with the second fixing region 332*b* interposed therebetween. According to an embodiment, as the fixing region 332 is formed as a concave portion, the contact region 333 may be represented as relatively protruding in relation with the fixing region 332. As described later, the connection portion 331 may be operably coupled to at least part (e.g., the fixing portion 314 (see FIG. 11) and/or an auxiliary region 316 (see FIG. 11)) of the cover 310 (refer to FIG. 11) through the above serration structure.

According to various embodiments, the connection member 330 may include a first separation prevention region 336 and a second separation prevention region 338. According to an embodiment, the first separation prevention region 336 and the second separation prevention region 338 may be disposed side by side with the connection portion 331 (e.g., on both sides of the connection portion 331). According to an embodiment, the first separation prevention region 336 and the second separation prevention region 338 may accommodate at least part (e.g., an operation portion 312) of the cover 310, and prevent separation of the cover 310 in a vertical direction (Z-axis direction). However, this is merely an example, and only a single separation prevention region (e.g., the first separation prevention region 336 or the second separation prevention region 338) may be formed.

According to various embodiments, the connection member 330 may include a slide region 334. According to an embodiment, the slide region 334 may be formed as a concave portion. For example, the slide region 334 may have a shape corresponding to that of an outer surface 312-1 of the operation portion 312, and accommodate the operation portion 312.

According to various embodiments, the distance (W3, see FIG. 10) between the first contact region 333*a* or the second contact region 333*b* and the slide region 334 may be formed to be smaller than the thickness W4 (see FIG. 11) of a protrusion 314*a* or 314*b*. As described above, as the connection member 330 is formed of an elastic material, the connection member 330 may press the operation portion 312 and stably hold the cover 310. In an embodiment, the distance W1 (see FIG. 10) between the connection portion 331 and the slide region 334 may be formed to be greater than the width W2 (see FIG. 11) of the operation portion 312. Therefore, the coupling between the cover 310 and the connection member 330 and the operation of the cover 310 may be facilitated. However, this is an example, and to strengthen the coupling between the cover 310 and the connection member 330, the distance W1 (see FIG. 10) between the connection portion 331 and the slide region 334 may be formed to be smaller than the width W2 (see FIG. 11) of the operation portion 312. According to various embodiments, the cover 310 may include the support portion 311 and the operation portion 312. According to an embodiment, the cover 310 may include the opening 313. For example, the opening 313 may be provided in combination with the support portion 311 and the operation portion 312. In another example, the opening 313 may be formed between the support portion 311 and the operation portion 312. According to an embodiment, the outer surface 312-1 of the operation portion 312 may be curved. For example, the outer surface 312-1 may be in the shape of a circular or elliptical arc. Further, the outer surface 312-1 may be accommodated in the slide region 334. When the cover 310 pivots, the outer surface 312-1 may slide on the slide region 334. According to an embodiment, the support portion 311 may receive an external force. For example, when an external force is applied to the support portion 311, the cover 310 may slide in contact with the connection member 330.

According to various embodiments, the operation portion 312 may include the fixing portion 314. For example, the fixing portion 314 may be formed on an inner surface 312-2 of the operation portion 312. According to an embodiment, the fixing portion 314 may include a plurality of protrusions. For example, the fixing portion 314 may include a first protrusion 314*a* and a second protrusion 314*b*. However, this is merely exemplary, and the fixing portion 314 may include one protrusion or three or more protrusions. Further, the fixing portion 314 may be formed as a concave portion. According to an embodiment, the fixing portion 314 may be accommodated in the fixing region 332. For example, the first protrusion 314*a* may be accommodated in the first fixing region 332*a*, and the second protrusion 314*b* may be accommodated in the second fixing region 332*b*.

According to various embodiments, the operation portion 312 may include the auxiliary region 316. According to an embodiment, the auxiliary region 316 may refer to a partial region of the inner surface 312-2 of the operation portion 312 adjacent to the fixing portion 314. For example, the auxiliary region 316 may include a first auxiliary region 316*a* and a second auxiliary region 316*b* disposed on both sides of the first protrusion 314*a*, with the first protrusion 314*a* interposed therebetween. In another example, the second auxiliary region 316*b* and a third auxiliary region 316*c* may be disposed with the second protrusion 314*b* interposed therebetween. Similarly to the contact region 333 described above, the fixing portion 314 is formed as a protrusion, and thus the auxiliary region 316 may be represented as relatively concave in relation to the fixing portion 314. The fixing portion 314 and/or the auxiliary region 316 may be coupled to the fixing region 332 and/or the contact region 333 in a serration structure.

According to various embodiments, the initial state of the tray 300 may mean a state in which the cover 310 closes the accommodation opening (e.g., the accommodation opening 239 of FIG. 6). According to various embodiments, in the initial state of the tray 300, the first protrusion 314*a* may be accommodated in the first fixing region 332*a*, and the second projection 314*b* may be accommodated in the second fixing region 332*b*. Further, the first, second and third auxiliary regions 316*a*, 316*b*, and 316*c* may contact at least parts of the first, second and third contact regions 333*a*, 333*b*, and 333*c*, respectively. In addition, the first support region 331-1*a* may be in contact with the bottom surface 311-1 of the support portion 311, and support the bottom surface 311-1. Due to the elastic force and restoring force of the connection member 330 and the coupling structure between the connection member 330 and the cover 310 (e.g., the coupling between the fixing portion 314 and the fixing region 332), the tray 300 may maintain the initial state.

According to various embodiments, when an external force is applied to the cover 310 (e.g., the support portion 311) in the initial state, the first protrusion 314*a* and the second protrusion 314*b* may be separated from the first fixing region 332*a* and the second fixing region 332*b*, respectively, and the cover 310 may pivot as a whole. For example, when an external force is applied to one side (+X-axis direction) of the support portion 311 in the vertical direction (e.g., −Y-axis direction), the cover 310 may pivot clockwise around the Z axis.

According to various embodiments, in the initial state, the cover 310 may substantially shield the accommodation opening (e.g., the accommodation opening 239 of FIG. 6). According to an embodiment, the width (X-axis direction length) of the cover 310 may correspond to the width (X-axis direction length) of the accommodation opening (e.g., the accommodation opening 239 of FIG. 6). The widths of the cover 310 and the accommodation opening (e.g., the accommodation opening 239 of FIG. 6) may correspond to each other, so that the introduction of a foreign material through the accommodation opening (e.g., the accommodation opening 239 of FIG. 6) may be reduced.

Figure 13:
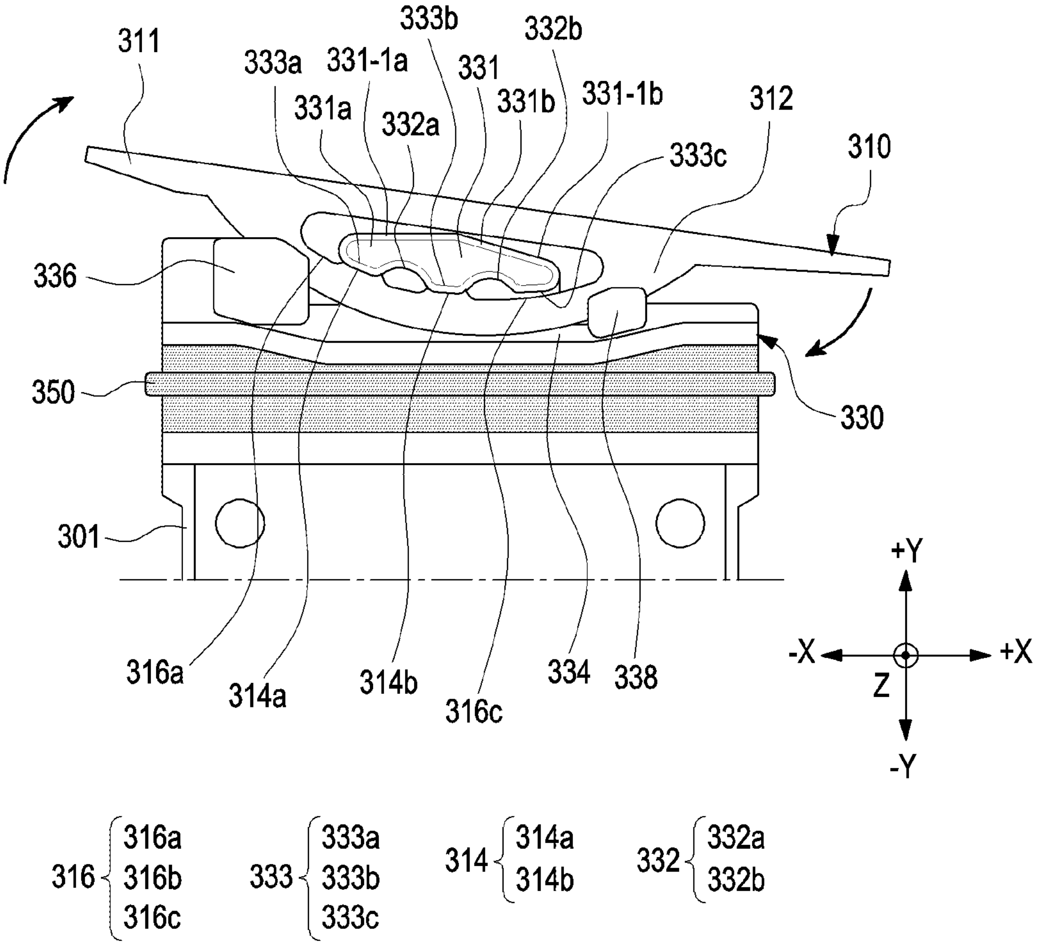
FIG. 13 is a diagram illustrating a slide state of a tray according to various example embodiments.
Figure 14:
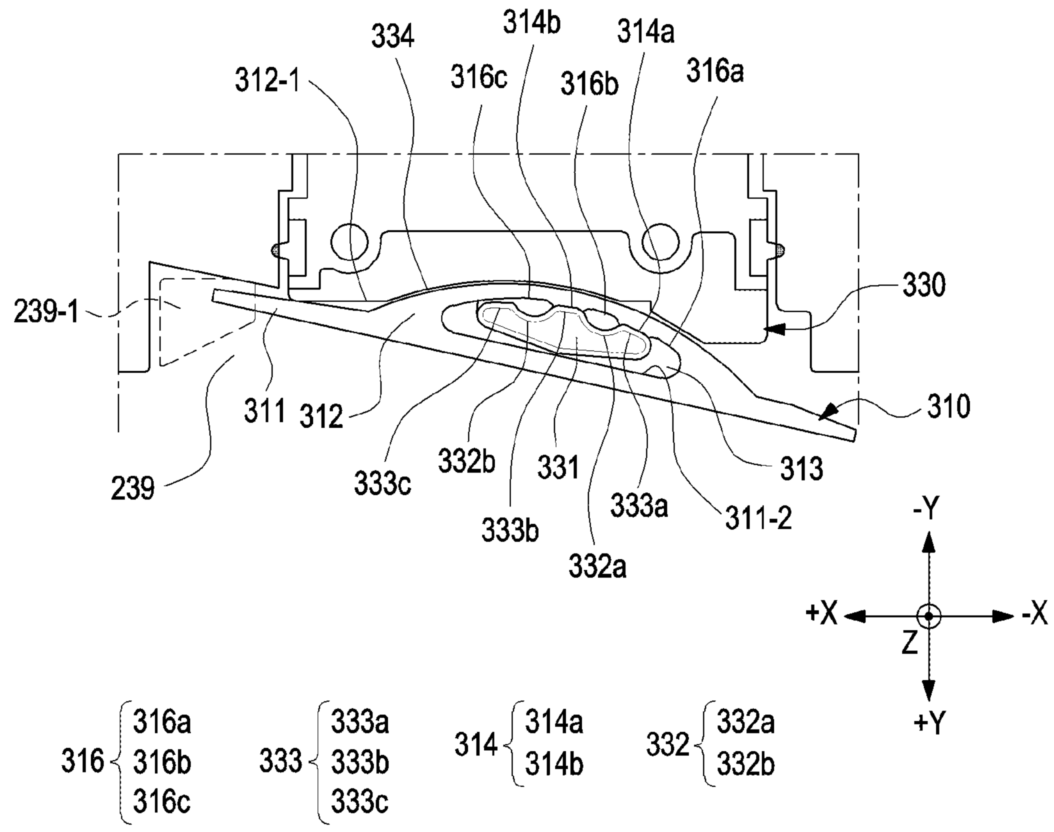
FIG. 14 is a diagram illustrating a slide state of a tray from the perspective of the inside of an electronic device according to various example embodiments.

FIG. 13 is a diagram illustrating the slide state of a tray according to various embodiments. FIG. 14 is a diagram illustrating the slide state of the tray from the perspective of the inside of an electronic device according to various embodiments.

Referring to FIGS. 13 and 14, the cover 310 may pivot in contact with the connection member 330. For example, when an external force is applied to the support portion 311, the cover 310 may pivot while the operation portion 312 is in contact with at least part (e.g., the slide region 334) of the connection member 330, and the position (or posture) of the cover 310 may be changed.

According to various embodiments, when an external force is applied to the support portion 311, the fixing portion 314 may be separated from the fixing region 332. For example, the first protrusion 314*a* may be separated from the first fixing region 332*a* and moved to the first contact region 333*a*. Similarly to the movement of the first protrusion 314*a*, the second protrusion 314*b* may be moved from the second fixing region 332*b* to the second contact region 333*b*. In another example, the outer surface 312-1 of the operation portion 312 may slide on the slide region 334 in contact with the slide region 334. In another example, the first support region 331-1*a* may be spaced apart from the bottom surface 311-2 of the support portion 311. As described above, when the cover 310 operates according to application of an external force, at least part (e.g., the fixing portion 314 and/or the auxiliary region 316) of the cover 310 may pivot in contact with at least part (e.g., the contact region 333 or the slide region 334) of the connection member 330.

According to various embodiments, when the cover 310 pivots by the elastic force and restoring force of the connection member 330, part of the connection member 330 may be deformed. For example, the first contact region 333*a* and/or the second contact region 333*b* may be pressed by the first protrusion 314*a* and/or the second protrusion 314*b*, and the operation portion 312 may stably pivot by the restoring force of the connection member 330.

According to various embodiments, at least part of the accommodation opening 239 may be opened in the slide state. For example, as the cover 310 pivots, part of an edge of one side (+X-axis direction) of the support portion 311 may be inserted into the accommodation opening 239, and part of an edge of the other side (−X-axis direction) may protrude to the outside of the electronic device 200. According to an embodiment, an extra space 239-1 for accommodating the cover 310 may be formed inside the accommodation opening 239.

Figure 15:
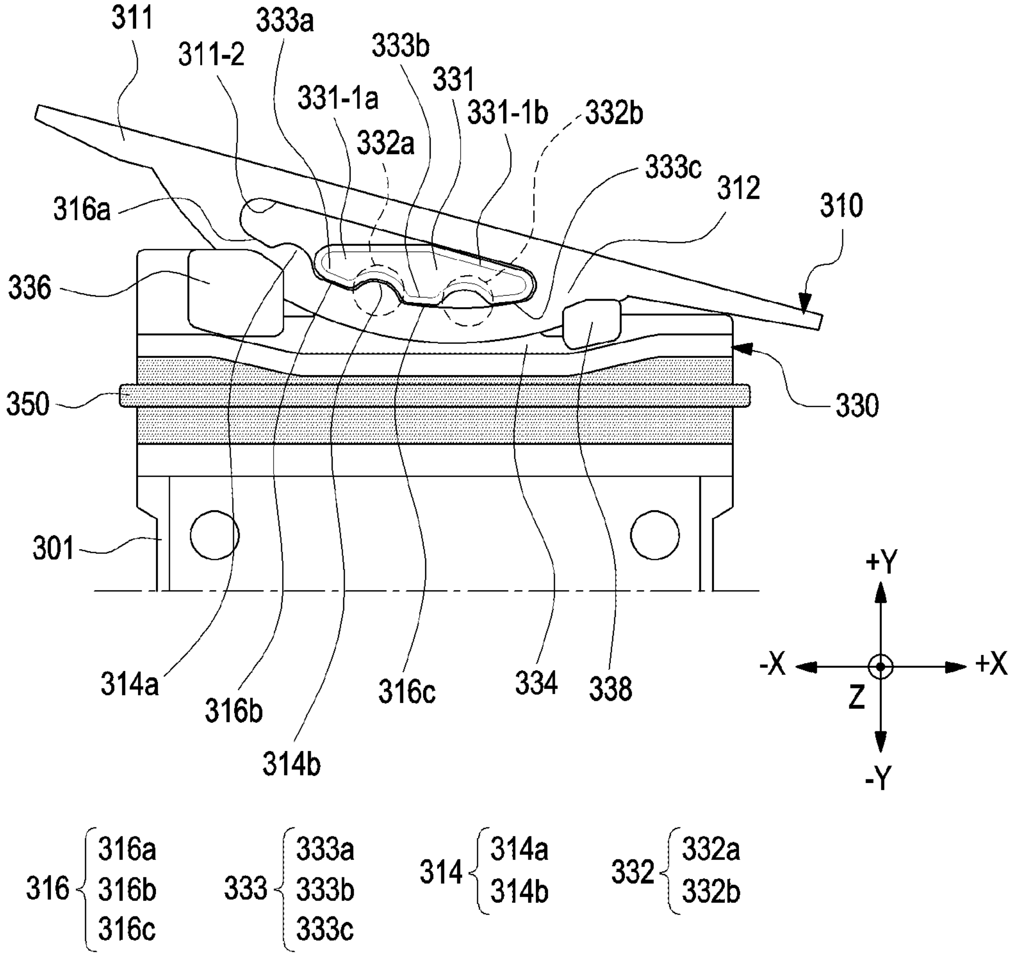
FIG. 15 illustrates an open state of a tray according to various example embodiments.
Figure 16:
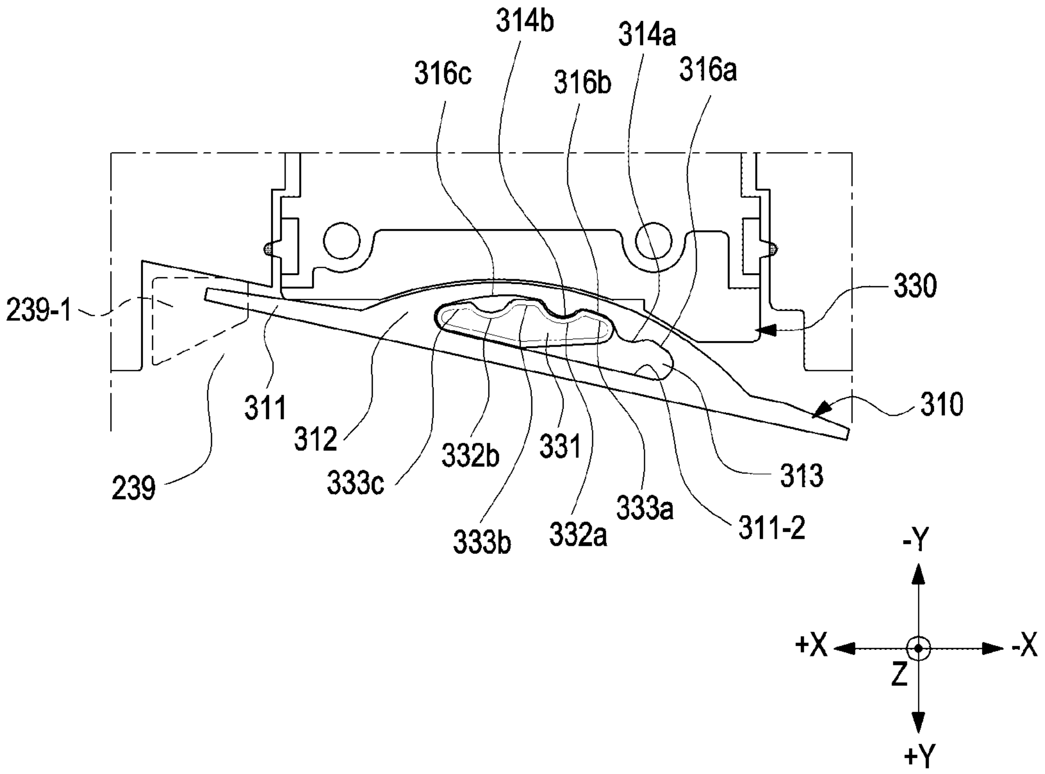
FIG. 16 is a diagram illustrating an open state of a tray from the perspective of the inside of an electronic device according to various example embodiments.

FIG. 15 illustrates the open state of a tray according to various embodiments. FIG. 16 is a diagram illustrating the open state of the tray from the perspective of the inside of an electronic device according to various embodiments.

Referring to FIGS. 15 and 16, the position (or posture) of the cover 310 may be fixed by the connection member 330 in a pivoted state (open state).

According to various embodiments, in the open state, the second protrusion 314*b* may be located in the first fixing region 332*a*. For example, the second protrusion 314*b* located in the second fixing region 332*b* in the initial state as described before with reference to FIG. 11 may be slidingly moved in contact with the second contact region 333*b* (the slide state of FIG. 13) up to the first fixing region 332 according to pivoting of the cover 310.

According to various embodiments, the shapes of the second auxiliary region 316*b* and the first contact region 333*a* may correspond to each other. For example, the first contact region 333*a* may be seated in the second auxiliary region 316*b* that is a concave region between the first protrusion 314*a* and the second protrusion 314*b*. According to an embodiment, the shape of the third auxiliary region 316*c* and the shape of the second contact region 333*b* to the third contact region 333*c* may correspond to each other. For example, part of the connection portion 331 corresponding to the second contact region 333*b* to the third contact region 333*c* may be mounted in the third auxiliary region 316*c*.

According to various embodiments, the second support region 331-1*b* may support at least part of the bottom surface 311-2 of the support portion 311. For example, the bottom surface 311-2 supported by the first support region 331-1*a* in the initial state may be supported by the second support region 331-1*b* in the open state according to the pivoting of the cover 310.

According to various embodiments, when an external force is applied to the tray 300 in the open state, the tray 300 may return to the initial state (e.g., the initial state of FIG. 11) through the slide state (e.g., the slide state of FIG. 13). It will be understood that the above descriptions may be applied adaptively to a process in which the tray 300 moves from the open state to the initial state.

According to various embodiments, in the open state, the area of the edge of the one side (+X-axis direction) of the cover 310 may be accommodated in the extra space 239-1, and the area of the edge of the other side (−X-axis direction) of the cover 310 may protrude to the outside of the electronic device 200. According to an embodiment, in the open state, the area of the edge of the other side (−X-axis direction) of the cover 310 may be spaced apart from the electronic device 200 by a predetermined distance or larger. Therefore, user convenience regarding attaching and detaching the tray 300 may be increased. For example, the user may easily take out the tray 300 from the electronic device 200, while gripping part of the protruding cover 310.

In describing the tray 300 illustrated in FIGS. 8 to 16, a concave portion (e.g., the fixing region 332) and a protrusion (e.g., the fixing portion 314) may be formed the other way around. For example, the fixing region 332 may be formed as a protrusion, and the fixing portion 314 may be formed as a concave portion. In addition, regarding the number of fixing regions 332 and the number of fixing portions 314, various design modifications may also be made without departing from the spirit of the disclosure, and fall within the scope of the disclosure. In describing trays according to second to sixth embodiments below, various design modifications may be made without departing from the spirit of the disclosure.

Figure 17:
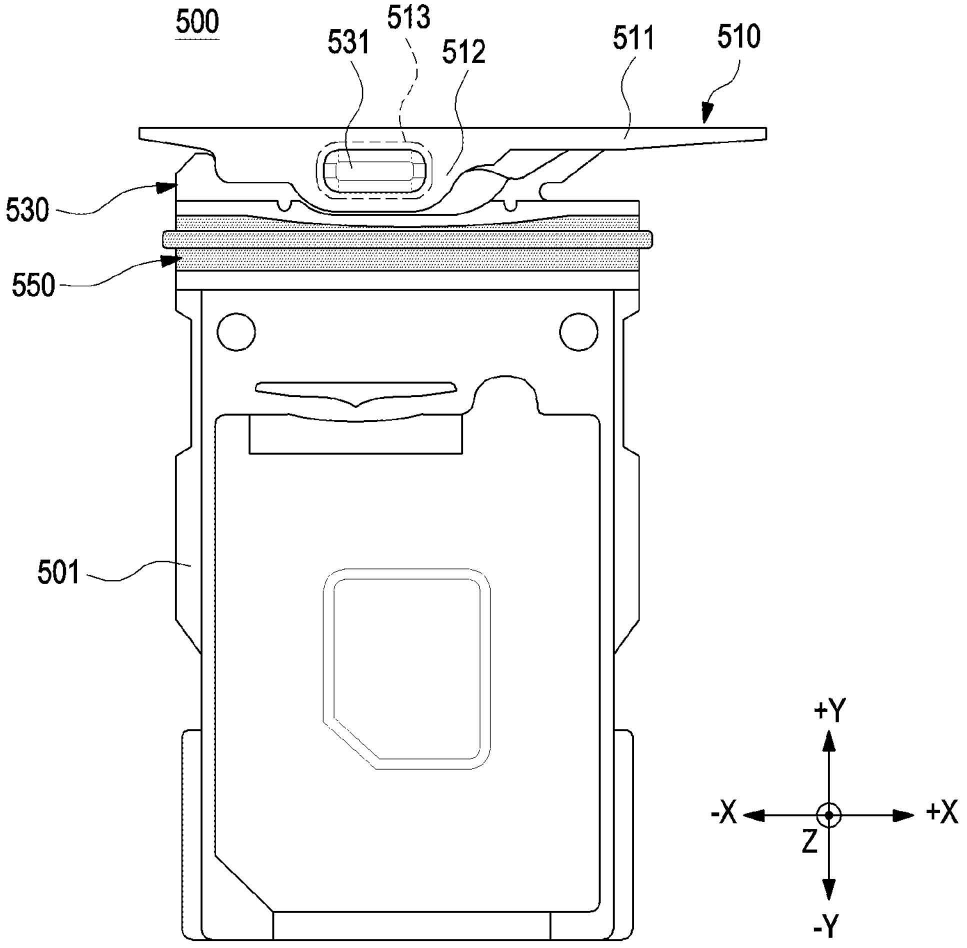
FIG. 17 is a diagram illustrating a tray according to a second example embodiment.
Figure 18:
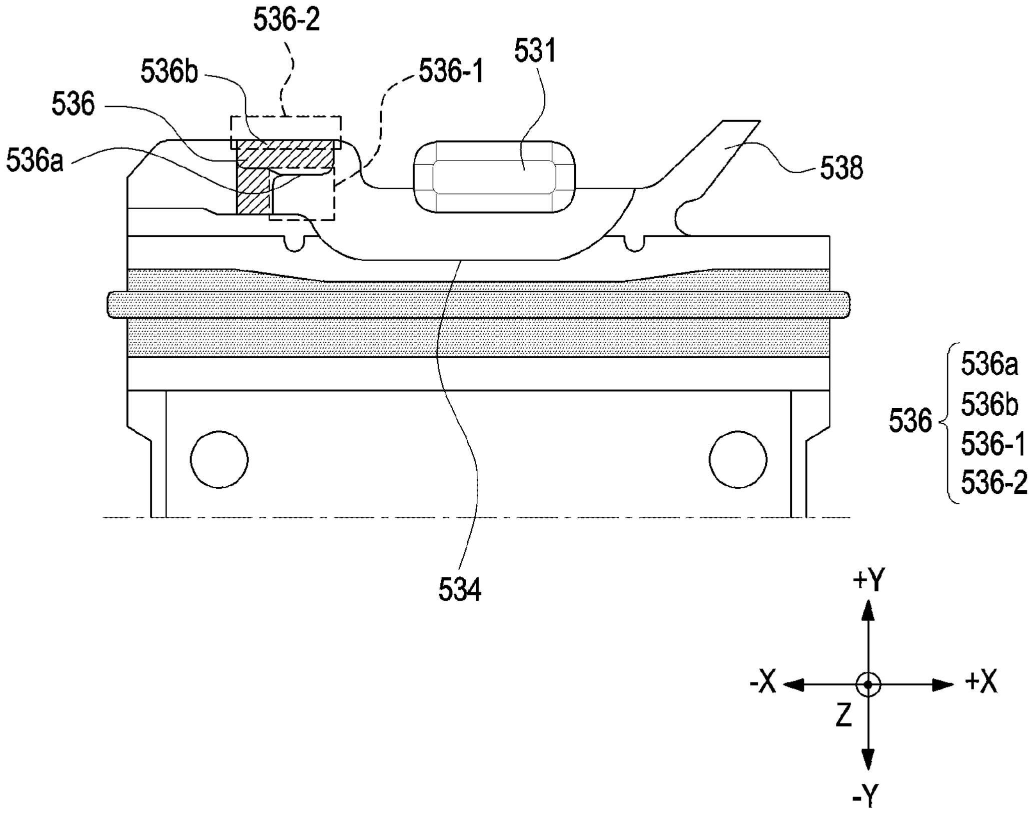
FIG. 18 is an enlarged view illustrating the part of a connection member in the tray according to the second example embodiment.

FIG. 17 is a diagram illustrating a tray according to a second embodiment. FIG. 18 is an enlarged view illustrating the part of a connection member in the tray according to the second embodiment.

Referring to FIGS. 17 and 18, a tray 500 may include a cover 510, a connection member 530, a body 501, and an elastic member 550. The whole or part of the description of the components (e.g., the cover 310, the connection member 330, the body 301, and the elastic member 350) of the tray 300 (see FIGS. 8 to 16) according to the foregoing embodiment may be adaptively applied to the cover 510, the connection member 530, the body 501, and the elastic member 550 of FIGS. 17 and 18.

According to various embodiments, the connection member 530 may include a connection portion 531, an elastic portion 536, and a restoration portion 538. According to an embodiment, the connection portion 531 may be operably coupled to at least part of the cover 510. For example, the connection portion 531 may be inserted into an opening 513 of the cover 510. According to an embodiment, the shape of the connection portion 531 may correspond to that of the opening 513. For example, the connection portion 531 may be formed to be larger in size than the opening 513, so that after the connection portion 531 and the cover 510 are coupled with each other, separation of the cover 510 may be prevented or reduced.

According to various embodiments, the elastic portion 536 may include a first fixing region 536-1 and a second fixing region 536-2. According to an embodiment, the first fixing region 536-1 may refer to a lower (−Y-axis direction) concave region of the elastic portion 536. According to an embodiment, the second fixing region 536-2 may refer to an upper (+Y-axis direction) region of the elastic portion 536. As described later, a bottom surface 536*a* (which may be referred to as a first surface 536*a*) or a top surface 536*b* (which may be referred to as a second surface 536*b*) of the elastic portion 536 may maintain the position (or posture) of the cover 510 in cooperation with a fixing portion (e.g., a fixing portion 514 of FIG. 19) according to the operation of the cover 510.

According to various embodiments, the restoration portion 538 may be disposed side by side with the connection portion 531. For example, with the connection portion 531 interposed therebetween, the restoration portion 538 and the elastic portion 536 may be disposed to face each other. According to an embodiment, the restoration portion 538 may be in contact with an edge region of one side (−X-axis direction) of the cover 510, and the elastic portion 536 may be in contact with an edge region of the other side (+X-axis direction) of the cover 510 or the fixing portion (e.g., the fixing portion 514 of FIG. 19). The restoration portion 538 may provide a restoring force to the cover 510, when the cover 510 pivots.

According to various embodiments, the connection member 530 may include a slide region 534. The description of the slide area 334 of the tray 300 according to the first embodiment may be adaptively applied to the slide region 534 of the tray 500 according to the second embodiment.

According to various embodiments, the cover 510 may include a support portion 511 and an operation portion 512. The description of the support portion 311 and the operation portion 312 according to the foregoing embodiments may be adaptively applied to the support portion 511 and the operation portion 512 according to the second embodiment.

Figure 19A:
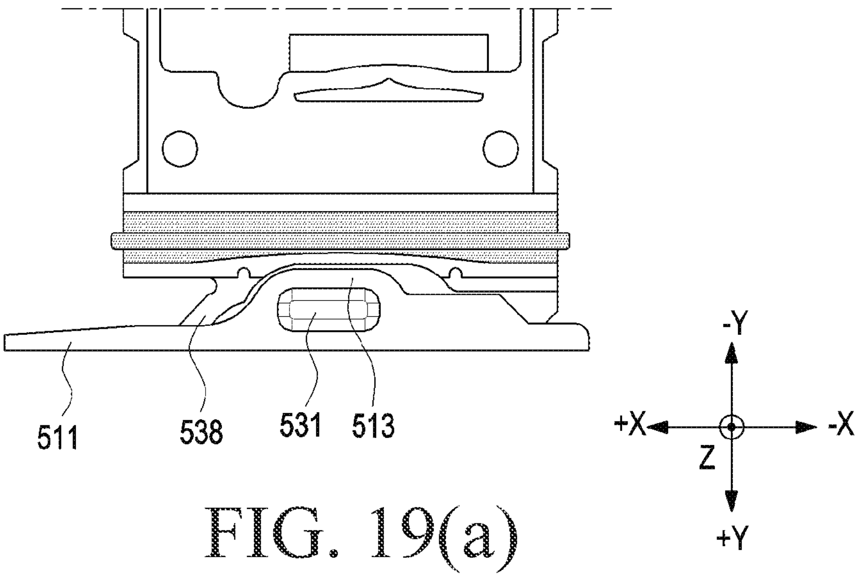
FIGS. 19(*a*)-(*b*) are diagrams illustrating an initial state of the tray according to the second example embodiment.
Figure 19B:
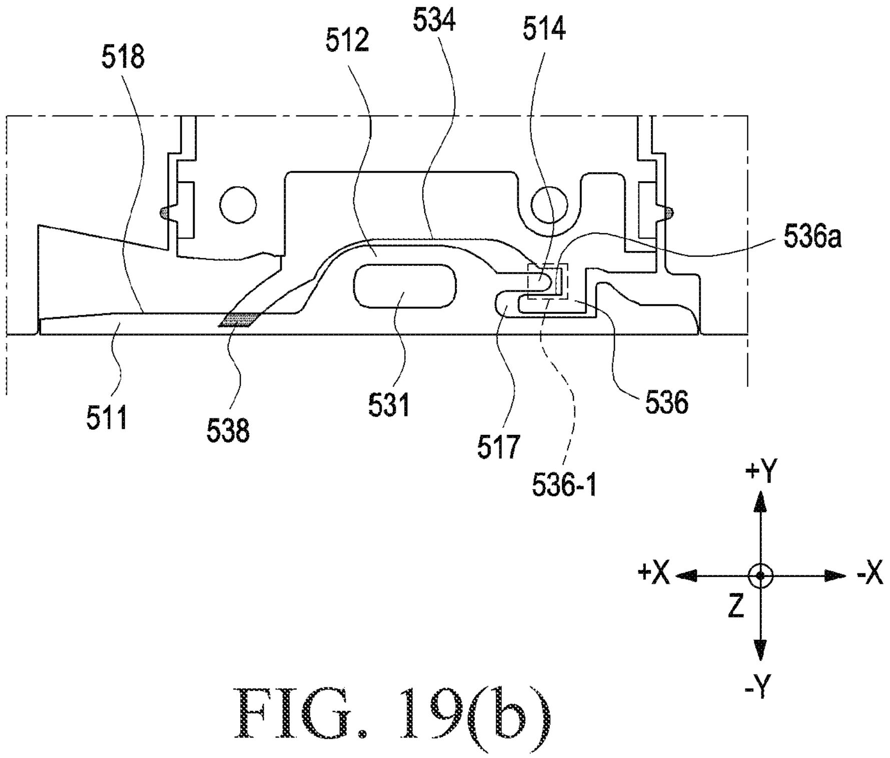
Figure 20A:
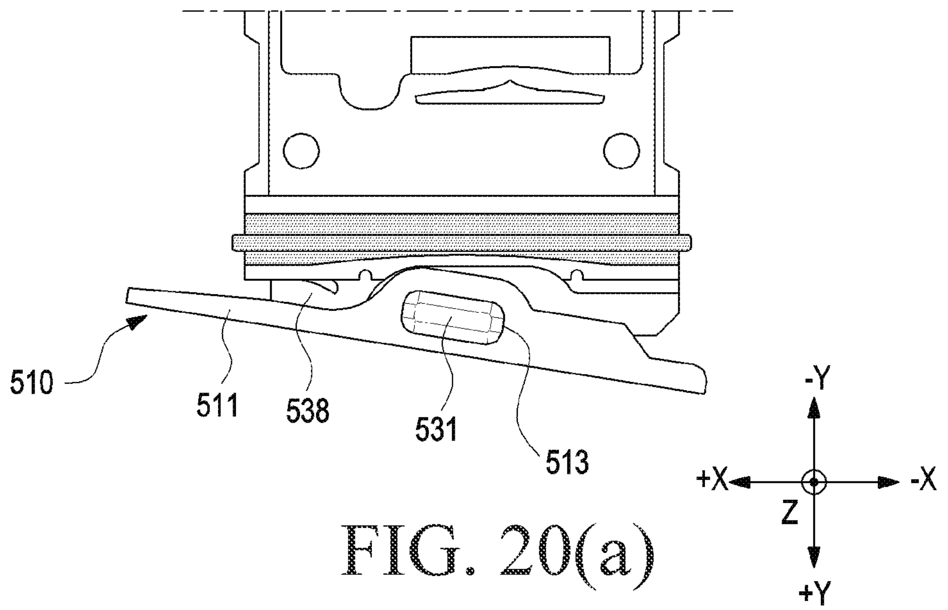
FIGS. 20(*a*)-(*b*) are diagrams illustrating a slide state of the tray according to the second example embodiment.
Figure 20B:
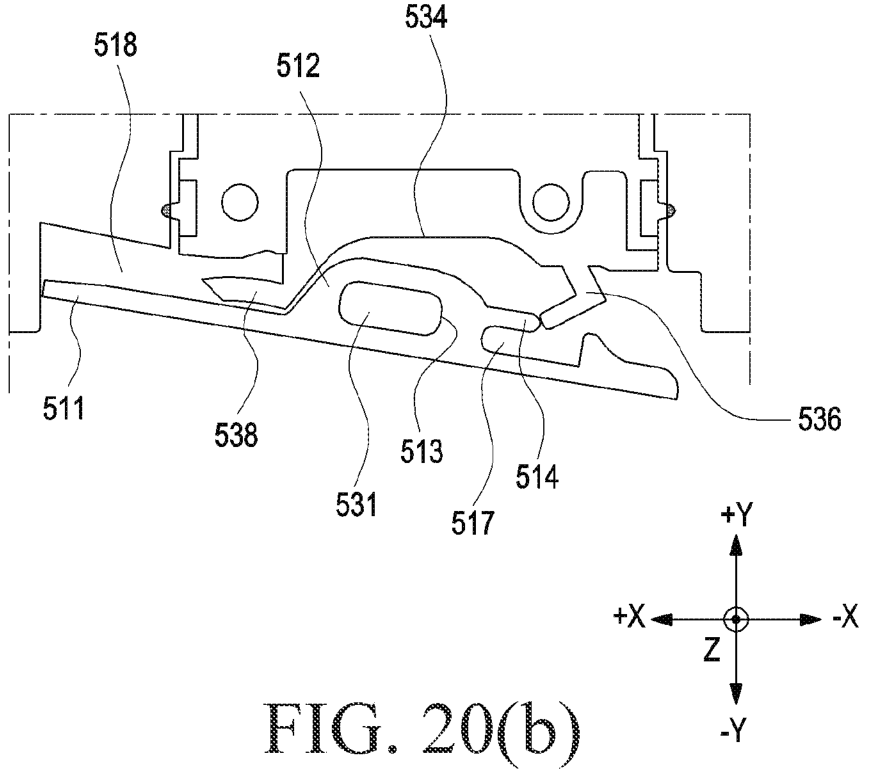
Figure 21A:
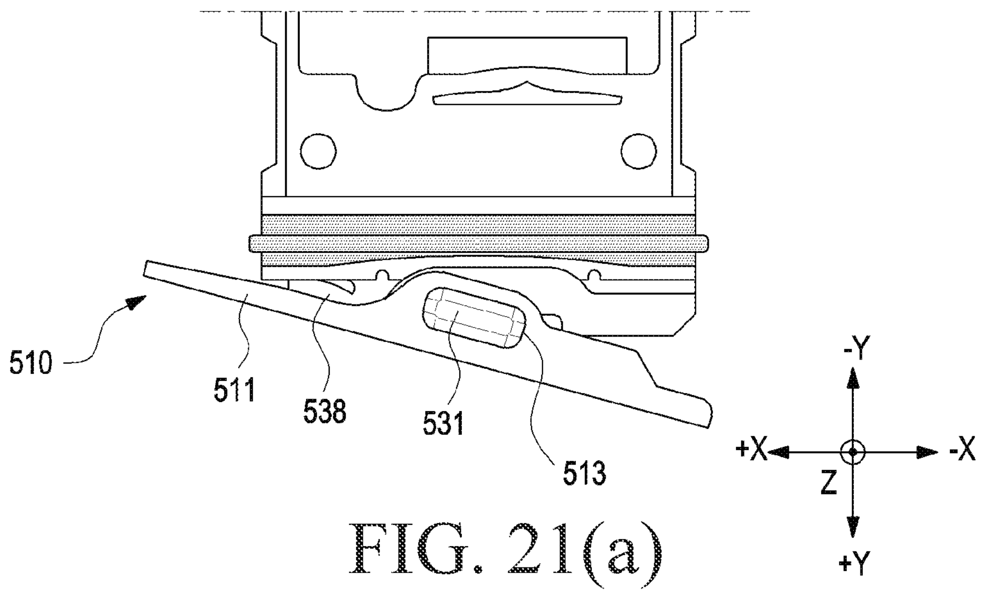
FIGS. 21(*a*)-(*b*) are diagrams illustrating an open state of the tray according to the second embodiment.
Figure 21B:
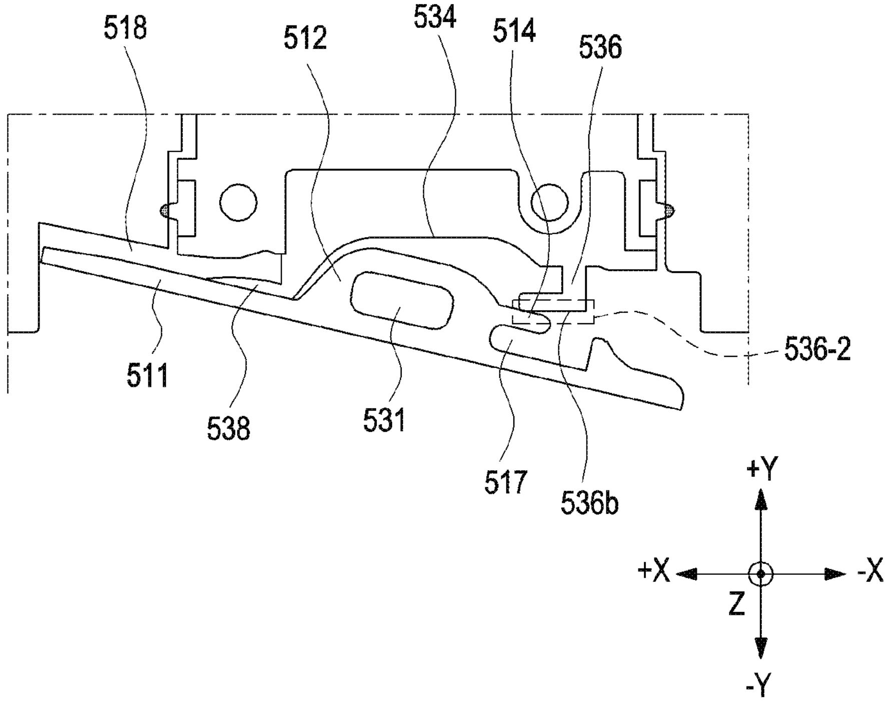

FIGS. 19, 20 and 21 are diagrams illustrating an operation process of the tray according to the second embodiment. FIG. 19 is a diagram illustrating the initial state of the tray according to the second embodiment. FIG. 19(*a*) is a diagram illustrating the initial state of the tray from the perspective of the outside, FIG. 19(*b*) is a diagram illustrating the initial state of the tray from the perspective of the inside of the electronic device. FIG. 20 is a diagram illustrating the slide state of the tray according to the second embodiment. FIG. 20(*a*) is a diagram illustrating the slide state of the tray from the perspective of the outside, and FIG. 20(*b*) is a diagram illustrating the slide state of the tray from the perspective of the inside of the electronic device. FIG. 21 is a diagram illustrating the open state of the tray according to the second embodiment. FIG. 21(*a*) is a diagram illustrating the open state of the tray from the perspective of the outside, and FIG. 21(*b*) is a diagram illustrating the open state of the tray from the perspective of the inside of the electronic device.

Referring to FIGS. 19, 20 and 21, the cover 510 may include the operation portion 512 and the support portion 511. The description of the operation portion 312 and the support portion 311 according to the first embodiment may be adaptively applied to the operation portion 512 and the support portion 511 according to the second embodiment. According to various embodiments, the operation portion 512 may include the fixing portion 514. For example, the fixing portion 514 may be formed as a protrusion. In the initial state, the fixing portion 514 may be located in the first fixing region 536-1. The shape of the first fixing region 536-1 may correspond to that of the fixing portion 514. The first surface **536*a* may fix the position (or posture) of the cover 510 by supporting the fixing portion 514**.

According to various embodiments, when an external force is applied, the cover 510 may pivot. Similarly to the foregoing embodiment, the tray 500 may be changed to the open state through the slide state, when an external force is applied in the initial state. According to an embodiment, when the cover 510 pivots, the connection portion 531 may be deformed to correspond to the pivoting of the cover 510, and the restoring force of the connection portion 531 may be transferred to the cover 510.

According to various embodiments, the elastic portion 536 may be pressed in the slide state. According to an embodiment, the elastic portion 536 may be pressed by the fixing portion 514 and bent in the −X-axis direction, in response to the pivoting of the cover 510. For example, the fixing portion 514 may be slidingly moved on the elastic portion 536, while pressing the elastic portion 536 in contact with at least part of the elastic portion 536.

According to various embodiments, in the open state, the fixing portion 514 may be located in the second fixing region 536-2. For example, in the slide state, the fixing portion 514 may pivot while pushing the elastic portion 536 in the first fixing region 536-1, and the fixing portion 514 may be in the second fixing region 536-2. Therefore, the tray 500 may be changed to the open state.

According to various embodiments, in the open state, the restoration portion 538 deformed by the pivoting of the cover 510 to a first direction (e.g., clockwise) may provide a restoring force in a second direction (e.g., counterclockwise) to the support portion 511. In addition, the connection portion 531 deformed in the first direction may also provide the restoring force in the second direction to the cover 510. The cover 510 provided with the restoring force from the restoration portion 538 and/or the connection portion 531 may be supported by the second surface **536*b* through the fixing portion 514, and the cover 510** may stably maintain the open state.

Figure 22:
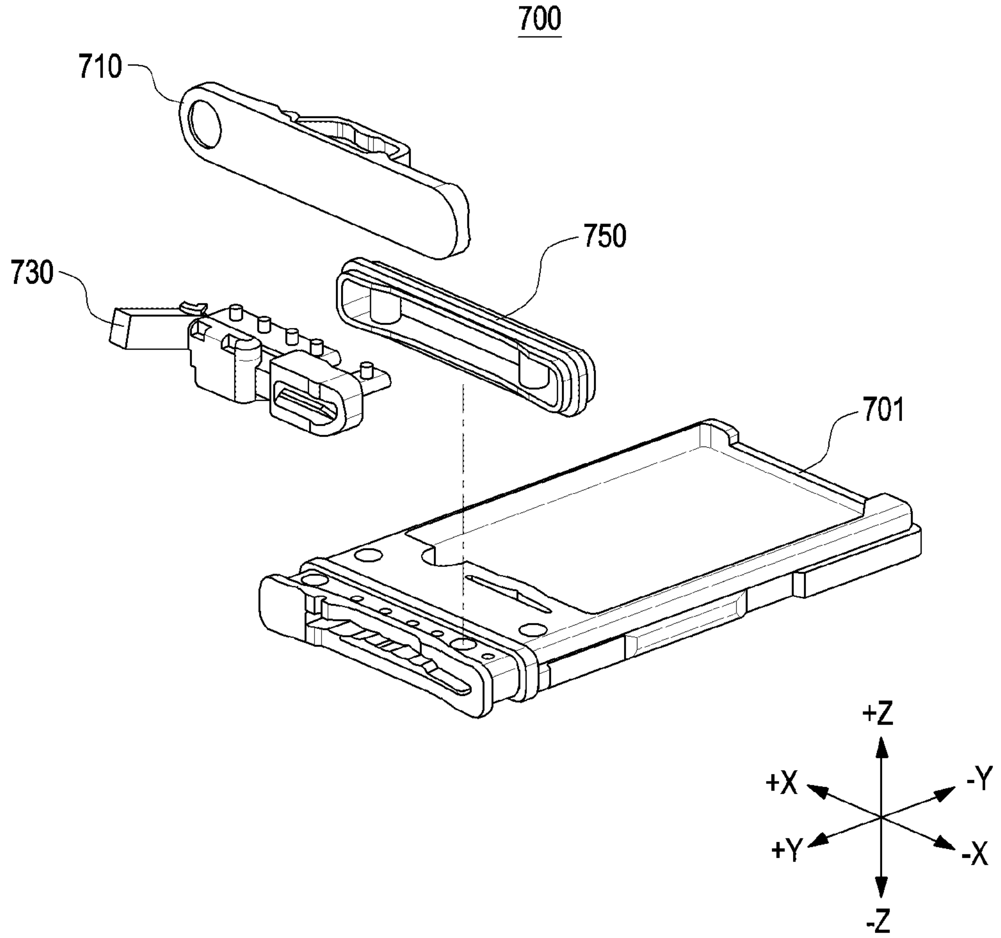
FIGS. 22, 23 and 24 are diagrams a tray according to a third example embodiment.
Figure 23:
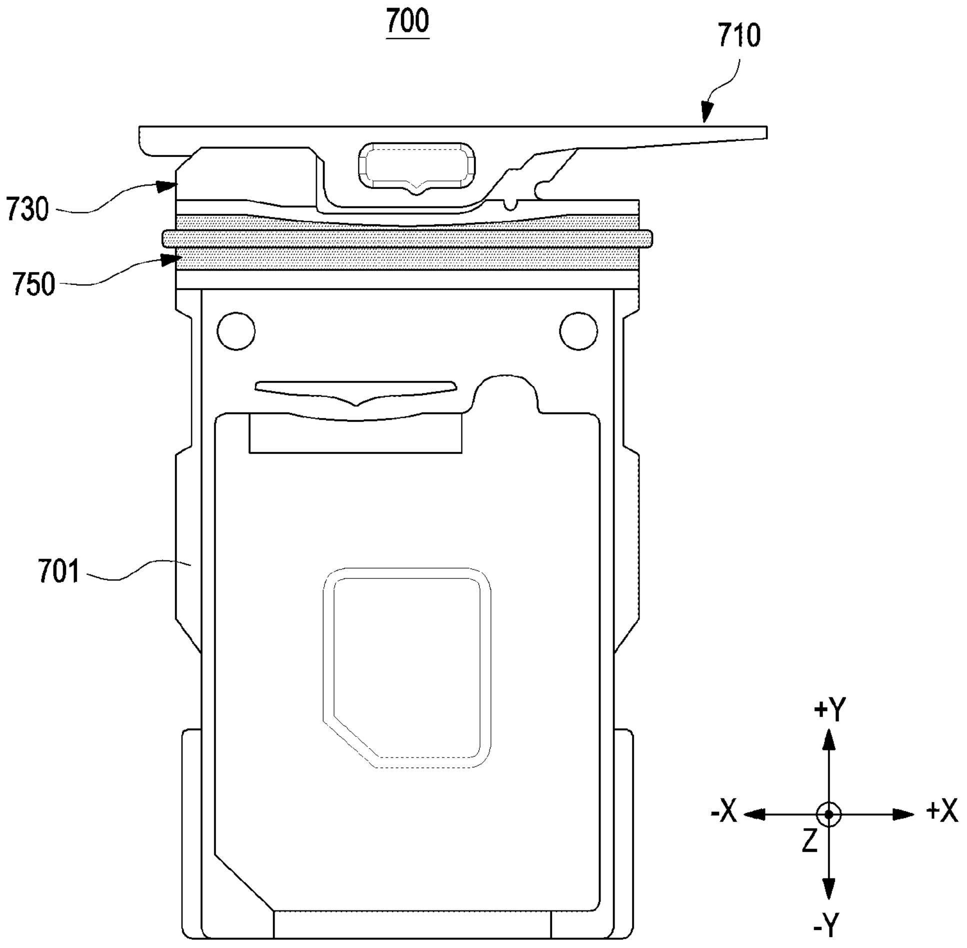
Figure 24:
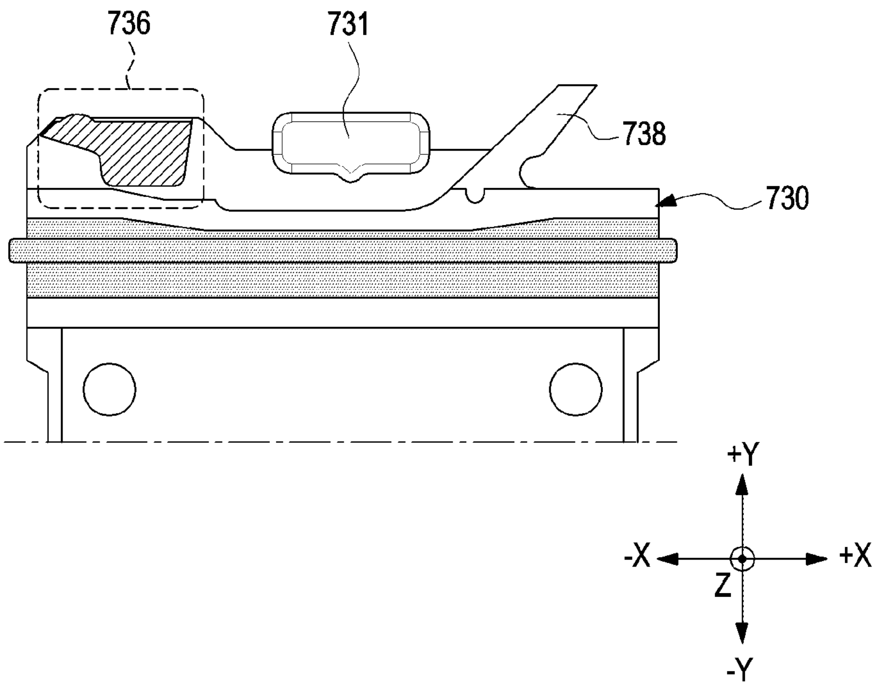

FIGS. 22, 23 and 24 are diagrams illustrating a tray according to a third embodiment. FIG. 22 is an exploded perspective view illustrating the tray according to the third embodiment. FIG. 23 is a top view illustrating the tray according to the third embodiment. FIG. 24 is an enlarged view illustrating a connection member according to the third embodiment.

Referring to FIGS. 22, 23 and 24, the tray 700 according to the third embodiment may include a cover 710, a connection member 730, an elastic member 750, and a body 701. The description of the tray 300 and/or the tray 500, or its components according to the foregoing embodiments may be adaptively applied to the cover 710, the connection member 730, the elastic member 750, and the body 701 or the coupling relationship between these components according to the third embodiment.

According to various embodiments, the connection member 730 may include a fixing region 736 formed in the vertical direction (e.g., −Y-axis direction). For example, the fixing region 736 may be a concave portion (or groove) formed in the −Y-axis direction. The fixing region 736 may maintain the position (or posture) of the tray 700 in cooperation with part (e.g., a fixing portion 714) of the cover 710.

Figure 25:
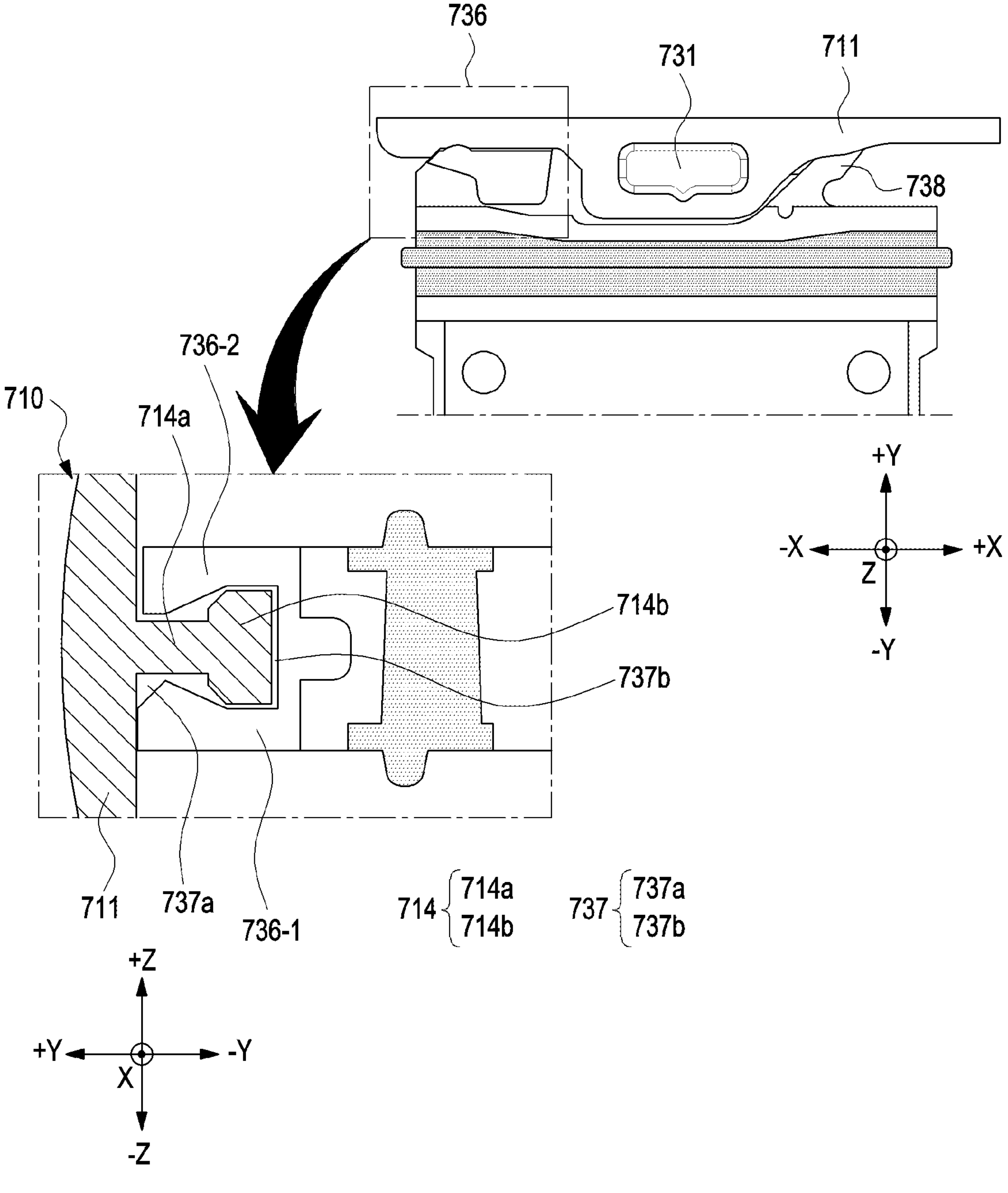
FIG. 25 is a diagram illustrating an initial state of the tray according to the third example embodiment.
Figure 26:
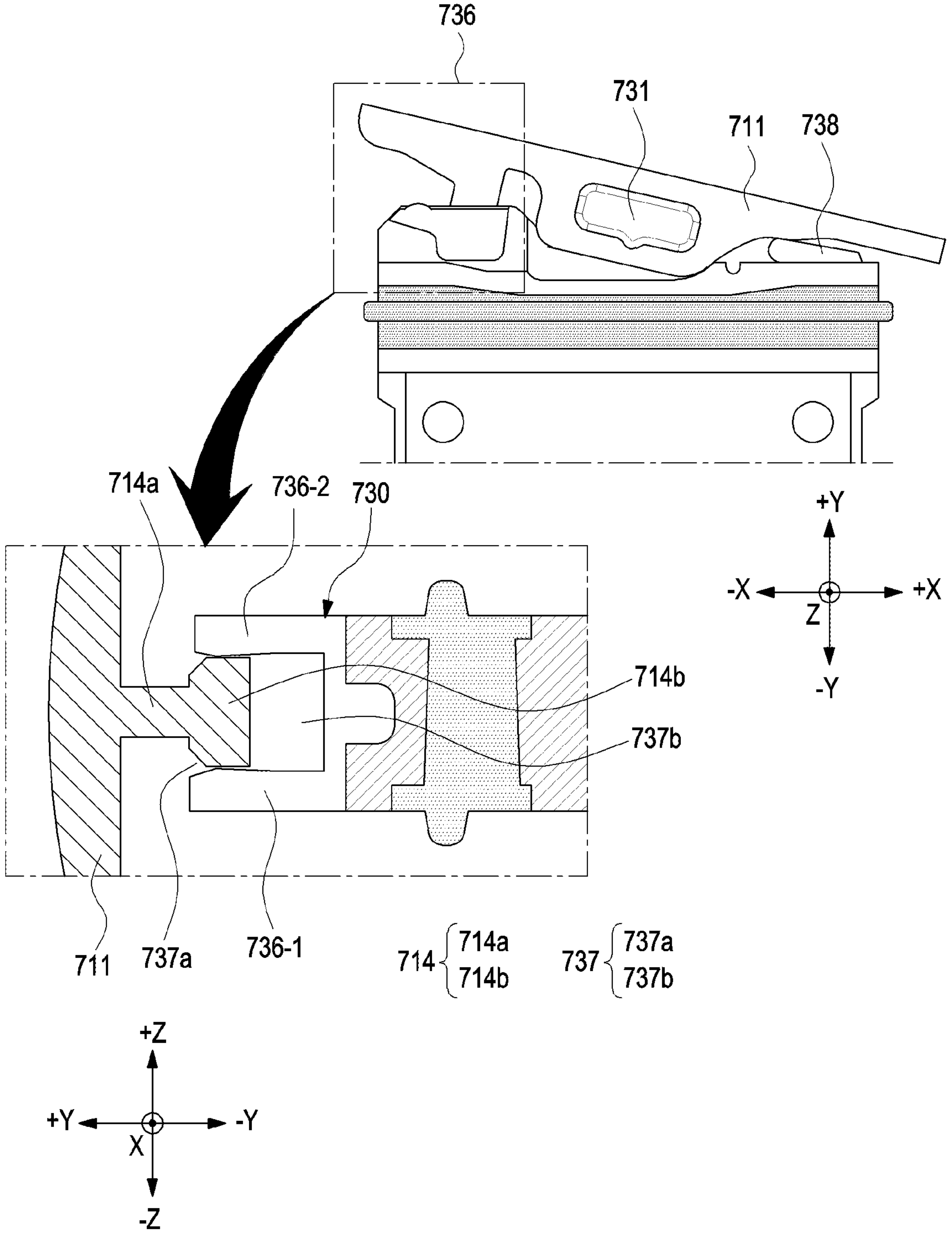
FIG. 26 is a diagram illustrating a slide state of the tray according to the third example embodiment.
Figure 27:
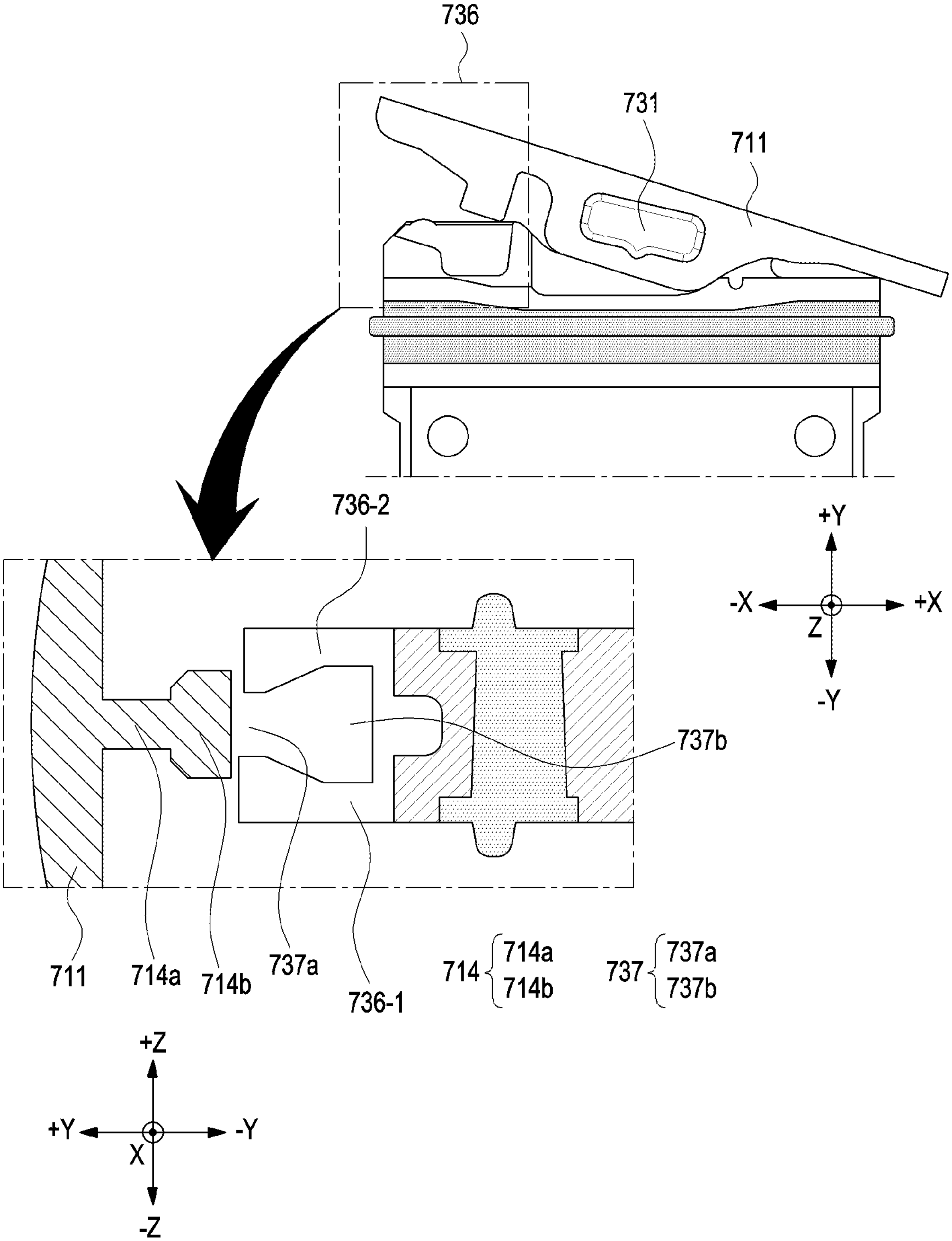
FIG. 27 is a diagram illustrating an open state of the tray according to the third example embodiment.

FIGS. 25, 26 and 27 are diagrams illustrating an operation process of the tray according to the third embodiment. FIG. 25 is a diagram illustrating the initial state of the tray according to the third embodiment. FIG. 25 is a diagram illustrating the initial state of the tray from the perspective of the outside, and a diagram illustrating a relationship between the fixing portion and the fixing region in the initial state of the tray. FIG. 26 is a diagram illustrating the slide state of the tray according to the third embodiment. FIG. 26 is a diagram illustrating the slide state of the tray from the perspective of the outside, and a diagram illustrating a relationship between the fixing portion and the fixing region in the slide state of the tray. FIG. 27 is a diagram illustrating the open state of the tray according to the third embodiment. FIG. 27 is a diagram illustrating the open state of the tray from the perspective of the outside, and is a cross-sectional view illustrating coupling between the fixing portion and the fixing region in the open state of the tray.

Referring to FIGS. 25, 26 and 27, the cover 710 may include the fixing portion 714. In addition, the connection member 730 may include the fixing region 736 for accommodating the fixing portion 714.

According to various embodiments, the fixing portion 714 may include an extension portion 714*a* and an insertion portion 714*b*. According to an embodiment, the extension portion 714*a* may be formed to extend from a support portion 711, and the insertion portion 714*b* may be formed at an edge of the extension portion 714*a*. For example, the thickness of the insertion portion 714*b* may be greater than the width of the extension portion 714*a*.

According to various embodiments, the connection member 730 may include the fixing region 736. According to an embodiment, the fixing region 736 may be formed as a concave portion (or groove) in an edge region of one side (−X-axis direction) of the connection member 730. According to an embodiment, the fixing region 736 may include a first region 736-1 and a second region 736-2. For example, the first region 736-1 and the second region 736-2 may refer to part of the connection member 730 forming a fixing opening 737. According to an embodiment, the fixing region 736 may include the fixing opening 737 for accommodating the fixing portion 714. For example, the fixing opening 737 may include a first fixing opening 737*a* and a second fixing opening 737*b*. For example, the first fixing opening 737*a* may refer to an inlet portion of the fixing opening 737, and the second fixing opening 737*b* may be a lower (+Y-axis direction) region of the fixing opening 737, for accommodating the insertion portion 714*b*. According to an embodiment, the width (or area) of the second fixing opening 737*b* may be formed to be greater than the width (or area) of the first fixing opening 737*a*. In another example, the fixing opening 737 may be in a tapered shape in which the width gradually decreases toward the inlet (in a direction to the first fixing opening 737*a* (+Y-axis direction)). In another example, the first region 736-1 and/or the second region 736-2 may be represented as a tapered shape in which the width gradually increases upward (+Y-axis direction). For example, in the initial state of the tray 700, the second fixing opening 737*b* may accommodate at least part of the insertion portion 714*b*, and the first fixing opening 737*a* may accommodate the extension portion 714*a*. In another example, the shape (e.g., the width or area) of the first fixing opening 737*a* may correspond to the shape of the extension portion 714*a*, and the shape (e.g., the width or area) of the second fixing opening 737*b* may correspond to the shape of the insertion portion 714*b*.

According to various embodiments, the connection member 730 may include a connection portion 731 and a restoration portion 738. The descriptions of the connection portions (e.g., the connection portion 331 of FIG. 10 and the connection portion 531 of FIGS. 17 to 21) and the restoration portion (e.g., the restoration portion 538 of FIGS. 17 to 21) in the foregoing embodiments may be adaptively applied to the connection portion 731 and the restoration portion 738 according to the third embodiment.

According to various embodiments, in the initial state of the tray 700, the fixing portion 714 may be accommodated in the fixing opening 737. For example, the insertion portion 714*b* may be mounted in the second fixing opening 737*b*. In addition, the width of the first fixing opening 737*a* may be formed to be smaller than that of the insertion portion 714*b*, and part of the connection member 730 corresponding to the fixing region 736 may be disposed to surround the insertion portion 714*b*. In another example, the first region 736-1 and the second region 736-2 may be located to surround at least part of the insertion portion 714*b* and the extension portion 714*a*. Accordingly, in the initial state of the tray 700, separation of the fixing portion 714 from the fixing region 736 may be prevented, and the posture (or position) of the tray may be maintained.

According to various embodiments, when an external force is applied to the support portion 711 and thus the tray 700 is changed to the slide state, the fixing portion 714 may be slidingly moved while pushing at least part of the connection member 730. For example, in response to pivoting of the cover 710, the insertion portion 714*b* may move up (+Y-axis direction), while pushing the first region 736-1 and/or the second region 736-2. For example, the first region 736-1 and/or the second region 736-2 may be changed to move in the X-axis direction (to widen the first fixing portion 737*a*) by being pressed by the fixing portion 714. According to an embodiment, when an external force is continuously applied in the slide state of the tray 700, the fixing portion 714 may be separated from the fixing opening 737, and the tray 700 may be switched to the open state.

According to various embodiments, in the open state of the tray 700, the fixing portion 714 may be located above (+Y-axis direction) the fixing region 736. For example, a bottom surface of the insertion portion 714*b* may be above all or some of the first opening 737*a*, the first region 736-1, and/or the second region 736-2 (+Y-axis direction). Because the width of the insertion portion 714*b* is formed to be greater than that of the first opening 737*a*, the fixing portion 714 may be prevented from being inserted into the fixing opening 737 again.

Figure 28:
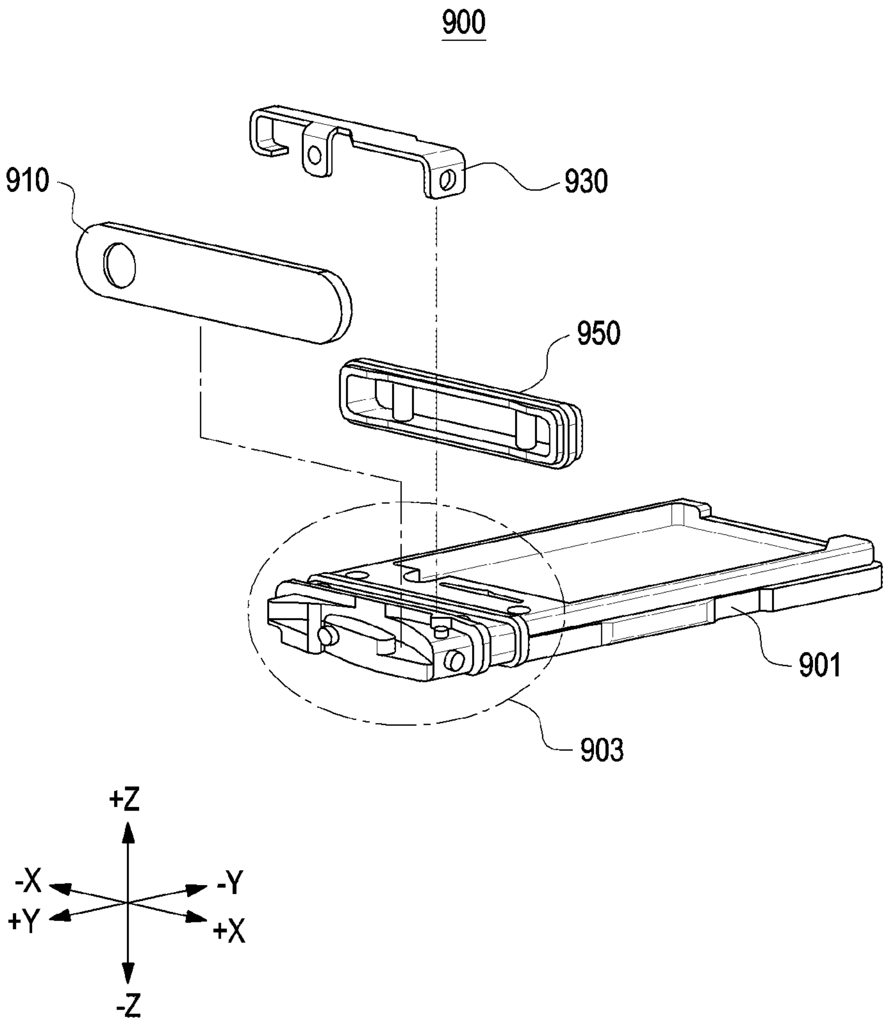
FIG. 28 is an exploded perspective view illustrating a tray according to a fourth example embodiment.
Figure 29A:
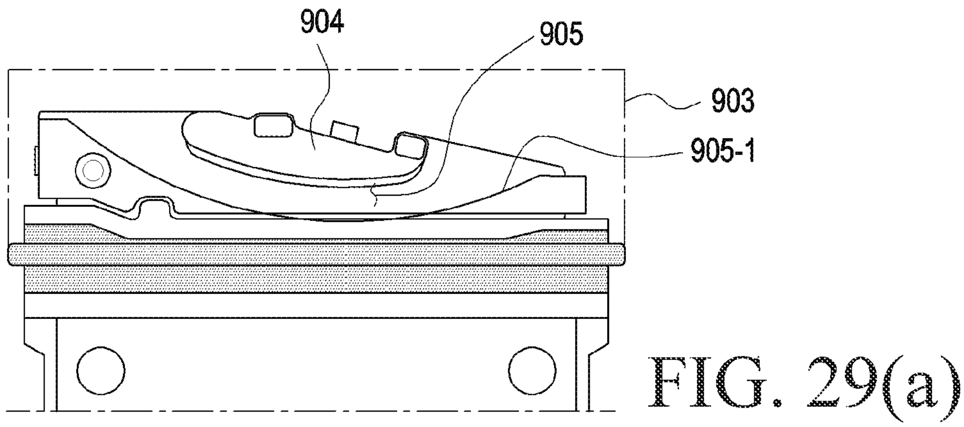
FIGS. 29(*a*)-(*c*) illustrate a process of assembling the tray according to the fourth example embodiment.
Figure 29B:
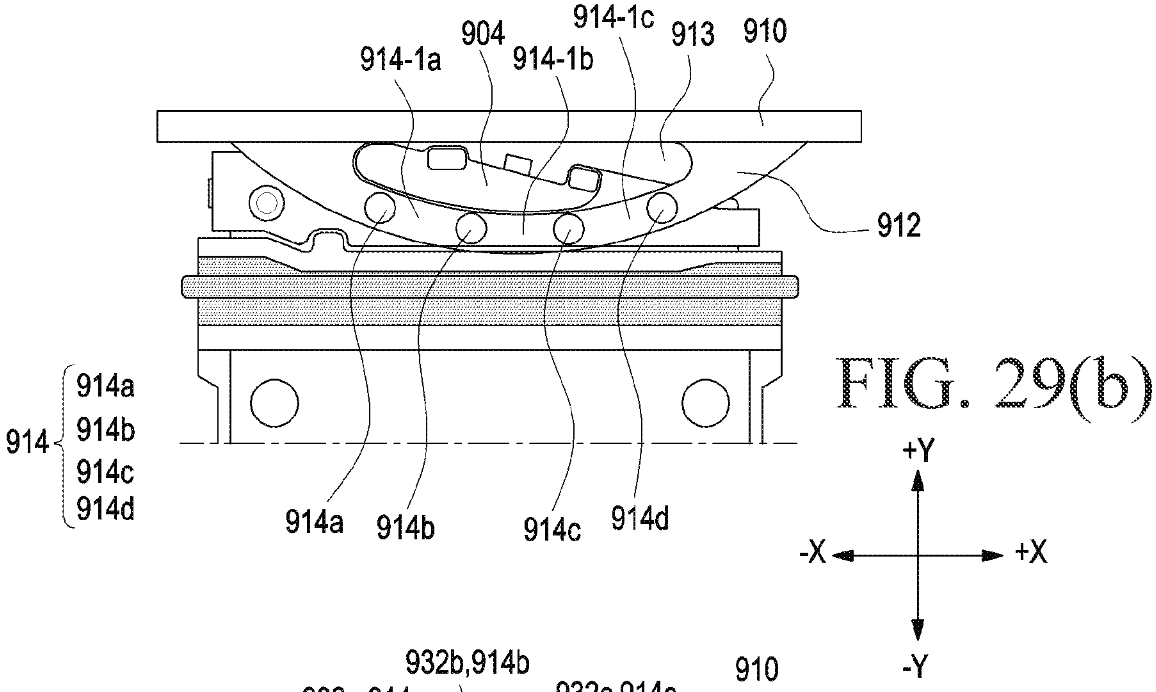
Figure 29C:
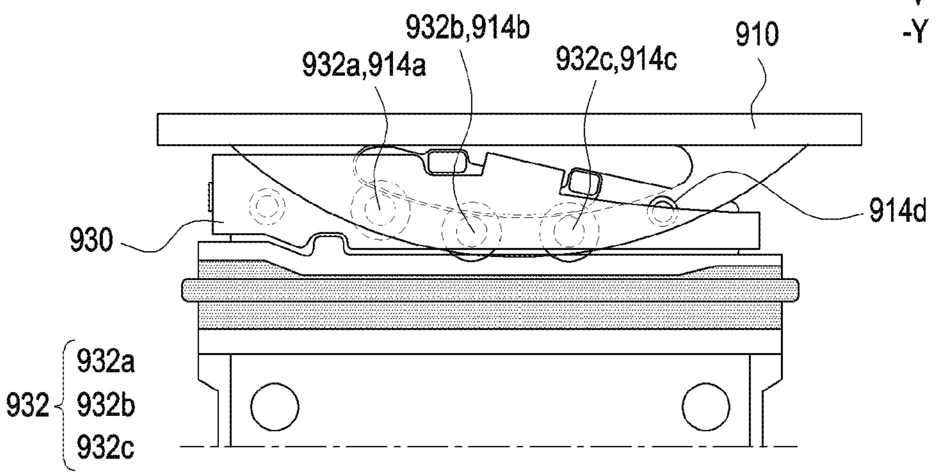

FIGS. 28 and 29 illustrate a tray according to a fourth embodiment. FIG. 28 is an exploded perspective view illustrating the tray according to the fourth embodiment. FIG. 29 illustrates a process of assembling the tray according to the fourth embodiment.

Referring to FIGS. 28 and 29, a tray 900 may include a cover 910, a fixing member 930, an elastic member 950, and a body 901. According to various embodiments, the body 901 may include an operation region 903 operably connectable to the cover 910 and/or the fixing member 930.

The foregoing descriptions of the trays 300, 500 and 700, the covers 310, 510 and 710, the connection members 330, 530 and 730, the elastic members 350, 550 and 750, and the bodies 301, 501 and 701 may be adaptively applied to the tray 900, the cover 910, the fixing member 930, the elastic member 950, and the body 901 of FIGS. 28 and 29, respectively.

According to various embodiments, the operation region 903 may include a connection portion 904 and a moving portion 905. For example, the operation region 903 may be formed by integrating a connection member (e.g., the connection member 330, 530, or 730) in the above-described embodiments into the body 901. According to an embodiment, the connection portion 904 may be operably coupled to the cover 910. For example, the connection portion 904 may be accommodated in an opening 913 of the cover 910. The shape of the connection portion 904 may correspond to at least part of the opening 913. The descriptions of the connection portions 331, 531, and 731 of the connection members 330, 530, and 730 in the forgoing embodiments may be adaptively applied to the connection portion 904. According to an embodiment, an operation portion 912 of the cover 910 may be accommodated in the moving region 905. For example, the operation portion 912 may pivot along the moving region 905. The operation area 903 may include a slide region 905-1 formed under (−Y-axis direction) the movement area 905. All or part of the descriptions of the slide regions 334, 534, and 734 in the above-described embodiments may be applied adaptively to the slide region 905-1.

According to various embodiments, the fixing member 930 may be disposed at an edge (e.g., the operation region 903) of one side of the body 901. According to an embodiment, the fixing member 930 may be formed of a metal material. For example, the fixing member 930 may be manufactured by, but not limited to, a press method, and like the above-described connection member (e.g., the connection member 330 of FIG. 10), the fixing member 930 may also be formed of a material such as urethane, rubber, or silicone.

According to various embodiments (referring to FIGS. 29(*a*) and 29(*b*)), the cover 910 may be disposed in an upper (+Y-axis direction) edge region of the body 901. For example, the cover 910 may be disposed such that the operation portion 912 is located in the moving region 905, and the connection portion 904 is accommodated in the opening 913.

According to various embodiments, the operation portion 912 may include a fixing region 914. According to an embodiment, the fixing region 914 may be formed as a plurality of concave portions (or grooves). For example, the fixing region 914 may include first to fourth fixing regions 914*a*, 914*b*, 914*c*, and 914*d*. However, this is only an example, and various numbers of fixing regions may be available. According to an embodiment, the plurality of fixing regions 914*a*, 914*b*, 914*c*, and 914*d* may be disposed to be spaced apart from each other by a predetermined interval. For example, the plurality of fixing regions 914*a*, 914*b*, 914*c*, and 914*d* may be disposed at the same interval or at different intervals. An opening angle of the cover 910 in the open state of the tray 900 may be adjusted according to the interval between the plurality of fixing regions 914*a*, 914*b*, 914*c*, and 914*d*. According to an embodiment, a plurality of auxiliary regions 914-1*a*, 914-1*b*, and 914-1*c* may be formed between the plurality of fixing regions 914*a*, 914*b*, 914*c*, and 914*d*, which will be described later.

According to various embodiments (referring to FIG. 29(*c*)), the fixing member 930 may be disposed to surround the operation region 903 (see FIG. 29(*a*)) and the cover 910 at least partially accommodated in the operation region 903. According to an embodiment, the fixing member 930 may include a fixing portion 932 to be accommodated in the fixing region 914. For example, the fixing portion 932 may be formed as a protrusion on part of the fixing member 930. In addition, a plurality of fixing portions 932 may be formed. For example, the fixing portion 932 may include first, second and third fixing portions 932*a*, 932*b*, and 932*c*. According to an embodiment, the shape of the fixing portion 932 may correspond to that of the fixing region 914. Further, an arrangement interval between the plurality of fixing portions 932*a*, 932*b*, and 932*c* may correspond to the arrangement interval between the plurality of fixing regions 913*a*, 913*b*, 913*c* and 913*d*.

Figure 30A:
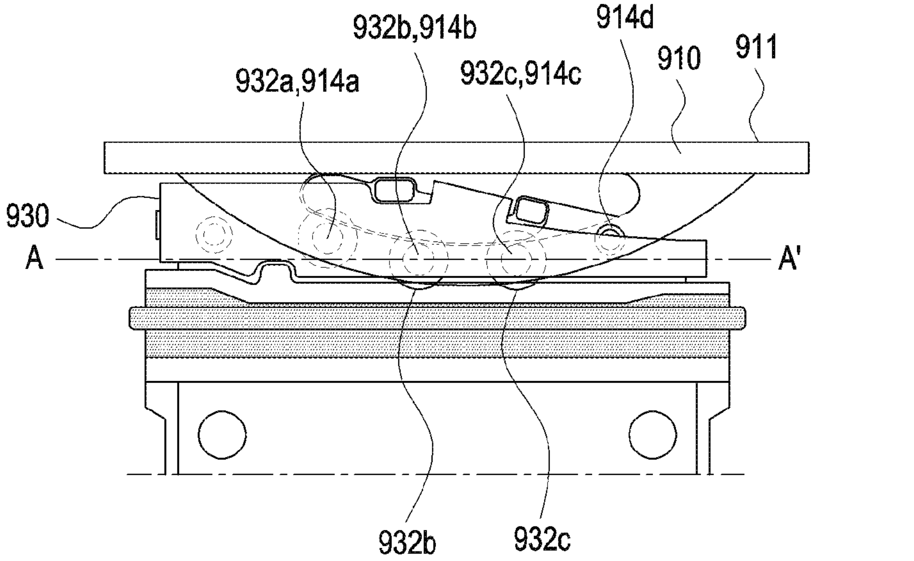
FIGS. 30(*a*)-(*b*) are diagrams illustrating an initial state of the tray according to the fourth example embodiment.
Figure 30B:
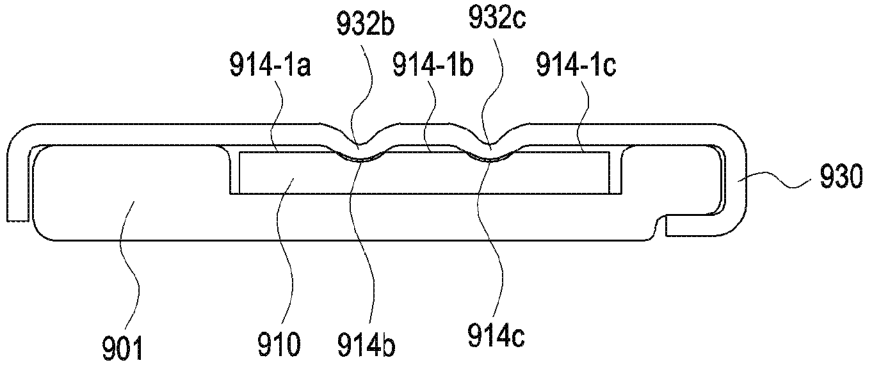
Figure 31A:
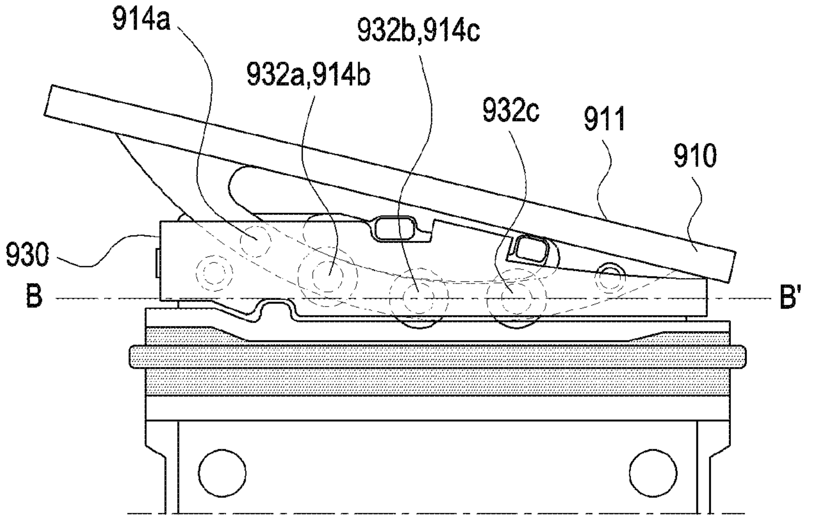
FIGS. 31(*a*)-(*b*) are diagrams illustrating an open state of the tray according to the fourth example embodiment.
Figure 31B:
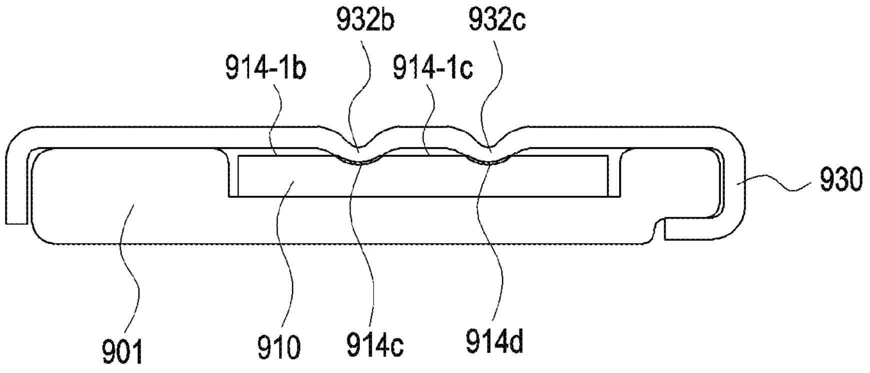

FIGS. 30 and 31 are diagrams illustrating an operation process of the tray according to the fourth embodiment. FIG. 30 is a diagram illustrating the initial state of the tray according to the fourth embodiment. FIG. 30(*a*) is a front view of the initial state, FIG. 30(*b*) is a diagram illustrating a cross-section A-A'. FIG. 31 is a diagram illustrating the open state of the tray according to the fourth embodiment. FIG. 31 (*a*) is a front view of the open state, and FIG. 31(*b*) is a diagram illustrating a cross section B-B' from FIG. 31(*a*).

Referring to FIGS. 30 and 31, the fixing portion 932 and the fixing region 914 may be combined and maintain the position of the cover 910.

According to various embodiments, in the initial state, the first, second and third fixing portions 932*a*, 932*b*, and 932*c* may be located in the first, second and third fixing regions 914*a*, 914*b*, and 914*c*, respectively. For example, the first, second and third fixing portions 932*a*, 932*b*, and 932*c* formed as protrusions may be inserted into the first, second and third fixing regions 914*a*, 914*b*, and 914*c* formed as concave portions, so that the position (the initial state) of the cover 910 may be fixed. In the initial state, when a force equal to or greater than a predetermined force (e.g., a friction force between the cover 910 and the fixing member 930 and/or an elastic force of the fixing member 930) is applied to an outer portion 911, the first, second and third fixing portions 932*a*, 932*b*, and 932*c* may be separated from the first, second and third fixing regions 914*a*, 914*b*, and 914*c*. For example, as the cover 910 pivots on the whole without a change in the positions of the first, second and third fixing portions 932*a*, 932*b*, and 932*c*, the first, second and third fixing portions 932*a*, 932*b*, and 932*c* may be separated from the first, second and third fixing regions 914*a*, 914*b*, and 914*c*.

According to various embodiments, in the open state, the first, second and third fixing portions 932*a*, 932*b*, and 932*c* may be located respectively in the second, third and fourth fixing regions 914*b*, 914*c* and 914*d*. For example, the first, second and third fixing portions 932*a*, 932*b*, and 932*c* formed as protrusions may be inserted into the second, third and fourth fixing regions 914*b*, 914*c* and 914*d* formed as concave portions, and thus the position (the open state) of the cover 910 may be fixed.

According to various embodiments, when the tray 900 moves from the initial state to the open state, the first, second and third auxiliary regions 914-1*a*, 914-1*b*, and 914-1*c* may slide in contact with at least parts of the first, second and third fixing portions 932*a*, 932*b*, and 932*c*. For example, as the cover 910 pivots on the whole without a change in the positions of the first, second and third fixing portions 932*a*, 932*b*, and 932*c*, the first, second and third auxiliary regions 914-1*a*, 914-1*b* and 914-1*c* located respectively between the first to fourth fixing regions 914*a*, 914*b*, 914*c*, and 914*d* may slide in contact with the first, second and third fixing portions 932*a*, 932*b*, and 932*c*.

Figure 32:
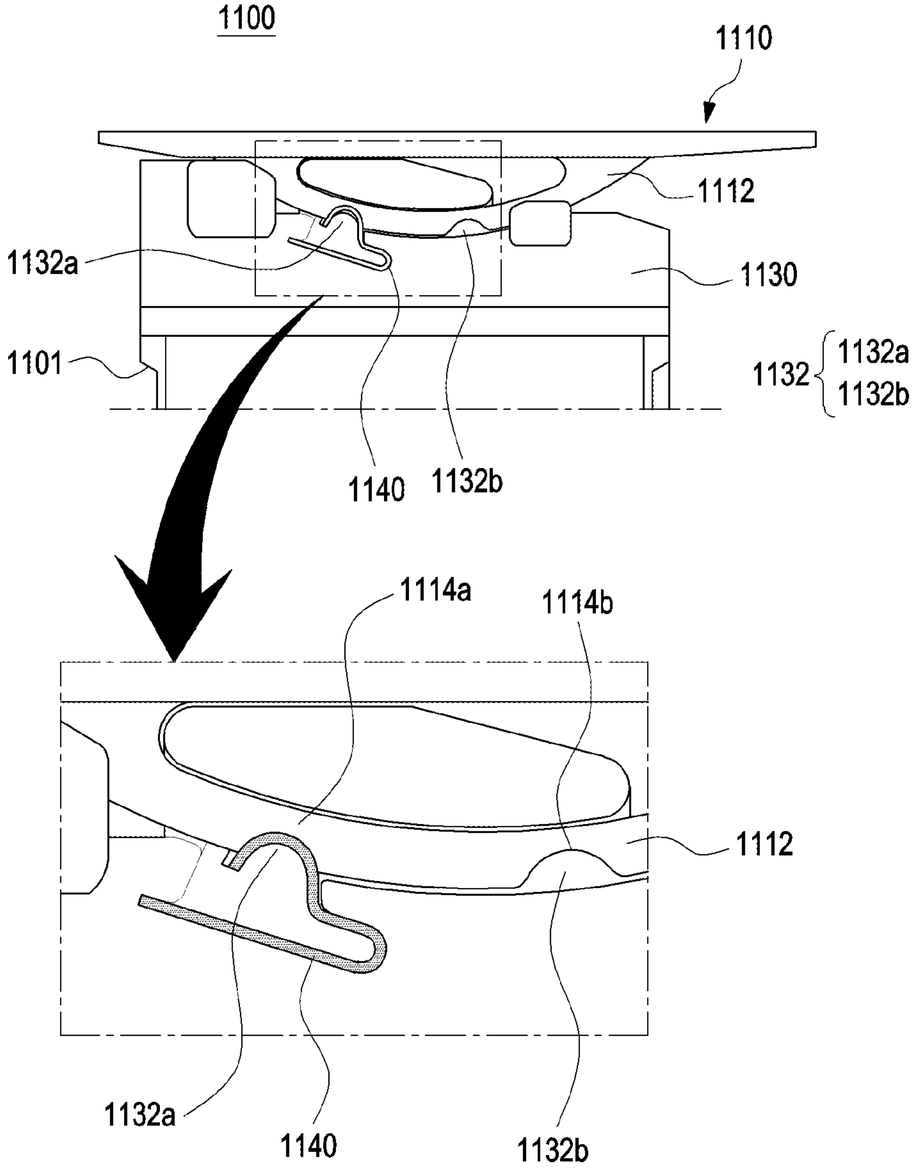
FIG. 32 is a diagram illustrating a tray according to a fifth example embodiment.

FIG. 32 is a diagram illustrating a tray according to a fifth embodiment.

Referring to FIG. 32, a tray 1100 according to various embodiments may include a cover 1110, a connection member 1130, a body 1101, and an auxiliary member 1140. All or some of the descriptions of the trays 300, 500, 700, and 900, the covers 310, 510, 710, and 910, the connection members 330, 530, and 730, and the bodies 301, 501, 701, and 901 may be adaptively applied to the tray 1100, the cover 1110, the connection member 1130, and the body 1101 of FIG. 32.

In the embodiment of FIG. 32, first and second fixing portions 1114*a* and 1114*b* formed as concave portions in the cover 1110 are illustrated, and first and second fixing regions 1132*a* and 1132*b* are illustrated. In an embodiment, the first fixing region 1132*a* may be formed as a protrusion, and the second fixing region 1132*b* may be formed as a flat region. In another example, both the first fixing region 1132*a* and the second fixing region 1132*b* may be formed as protrusions. In another example, both the first fixing region 1132*a* and the second fixing region 1132*b* may be formed as flat regions.

For the coupling relationship between the first and second fixing portions 1114*a* and 1114*b* and the first and second fixing regions 1132*a* and 1132*b* of FIG. 32, the description of a fixing portion (e.g., the fixing portion 314 of 11) and a fixing region (e.g., the fixing region 332 of FIG. 11) in the foregoing embodiments may be applied adaptively.

According to various embodiments, the auxiliary member 1140 may have an elastic force. For example, the auxiliary member 1140 may be various types of springs. According to an embodiment, the auxiliary member 1140 may be disposed to correspond to a fixing region 1132. For example, the auxiliary member 1140 may be disposed to cover part of the first fixing region 1132*a*. As the auxiliary member 1140 is disposed in the fixing region 1132, the elastic force of the auxiliary member 1140 may be additionally provided to an operation portion 1112, in addition to the elastic force of the connection member 1130. Accordingly, the position of the cover 1110 may be maintained. While the auxiliary member 1140 is disposed to surround the first fixing region 1132*a* formed as a protrusion in the illustrated embodiment, this is only exemplary. As described above, when the first fixing region 1132*a* is formed as a flat region, the auxiliary member 1140 may be disposed to protrude from part of the first fixing region 1132*a*.

Figure 33:
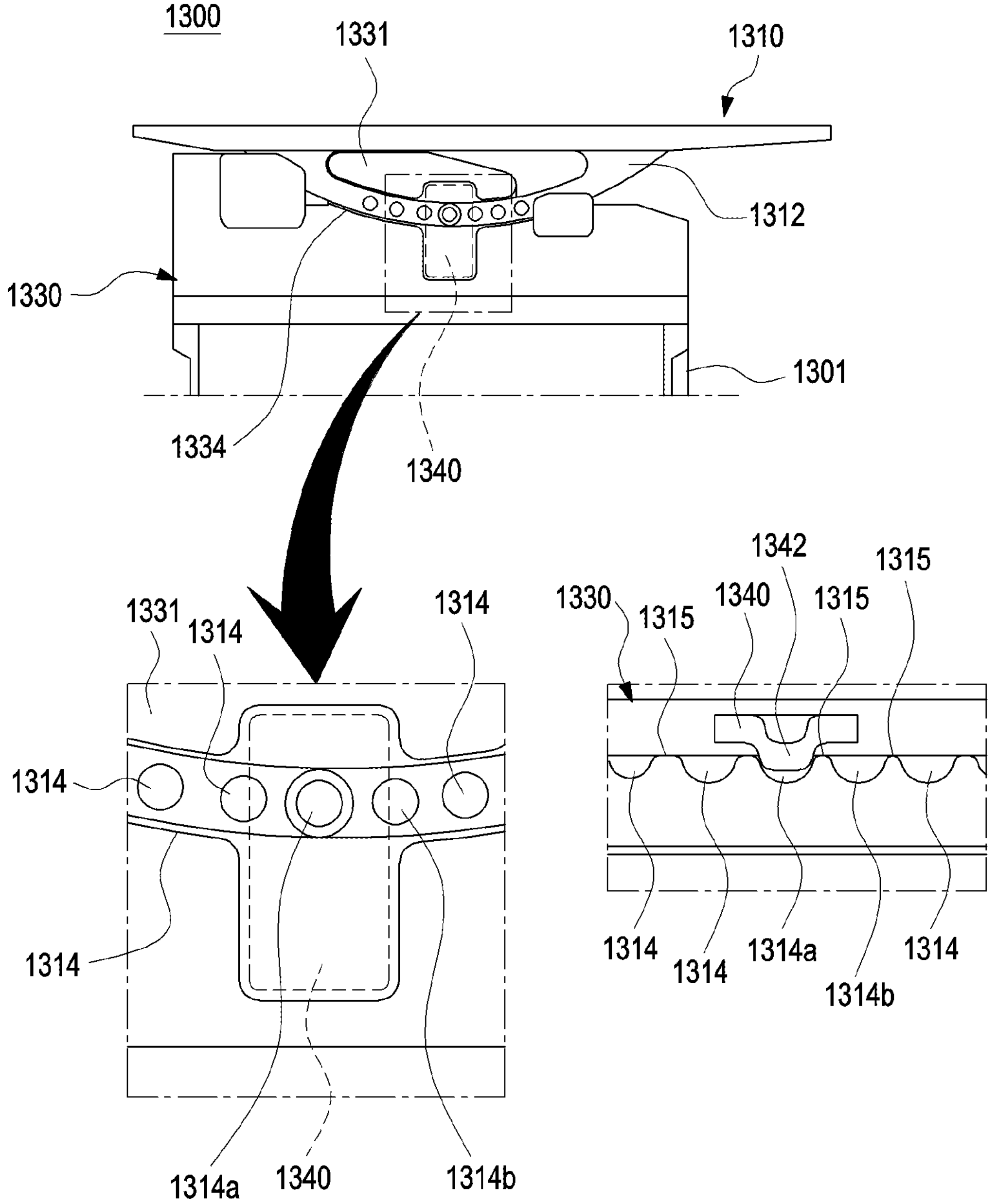
FIG. 33 is a diagram illustrating a tray according to a sixth example embodiment.

FIG. 33 is a diagram illustrating a tray according to a sixth embodiment.

Referring to FIG. 33, a tray 1300 according to various embodiments may include a cover 1310, a connection member 1330, a body 1301, and an auxiliary member 1340. All or some of the descriptions of the trays 300, 500, 700, and 900, the covers 310, 510, 710, and 910, the connection members 330, 530, and 730, and the bodies 301, 501, 701, and 901 may be adaptively applied to the tray 1300, the cover 1310, the connection member 1330, and the body 1301 of FIG. 33.

According to various embodiments, the cover 1310 may include an operation portion 1312 in which a plurality of fixing regions 1314 are formed. The fixing regions 1314 may be formed as concave portions (or grooves) in at least part of the operation portion 1312.

According to various embodiments, the auxiliary member 1340 may include a protrusion 1342 to be accommodated in the fixing region 1314. According to an embodiment, the auxiliary member 1340 may be disposed to contact at least part of the operation portion 1312. For example, the auxiliary member 1340 may be disposed to couple a connection portion 1331 and a slide region 1334 to each other, and contact part of the operation portion 1312 disposed between the connection portion 1331 and the slide region 1334.

According to various embodiments, the protrusion 1342 may be located in at least one of the plurality of fixing regions 1314 formed in the operation portion 1312 to correspond to the position (or posture) of the tray 1300. For example, when the cover 1310 pivots, the protrusion 1342 may be separated from the first fixing region 1314*a* and located in the second fixing region 1314*b*. For example, as the cover 1310 pivots while the protrusion 1342 is fixed, a relative position of the protrusion 1342 (e.g., a relative position between the cover 1310 and the auxiliary member 1342) may move from a first fixing region 1314*a* to a second fixing region 1314*b*, and the protrusion 1342 may slide in contact with at least part (e.g., an auxiliary region 1315 formed between the plurality of fixing regions 1314) of the cover 1310.

According to various embodiments, an electronic device may be provided, including: a housing (e.g., the housing 210 of FIG. 2) including an opening (e.g., the accommodation opening 239 of FIG. 6); a circuit board (e.g., the circuit board 240 of FIG. 4) disposed in the housing; a socket (e.g., the socket 290 of FIG. 5) disposed on the circuit board; and a tray (e.g., the tray 300 of FIG. 6) to be inserted into the socket. The tray may include: a body (e.g., the body 301 of FIG. 9) including an accommodation space (e.g., the accommodation space 301*a* of FIG. 9); a connection member (e.g., the connection member 330 of FIG. 10) disposed adjacent to the body and including a first fixing region (e.g., the first fixing region 332*a* of FIG. 10) and a second fixing region (e.g., the second fixing region 332*b* of FIG. 10) spaced apart from the first fixing region; and a cover (e.g., the cover 310 of FIG. 11) including a support portion (e.g., the support portion 311 of FIG. 11) for shielding the opening and an operation portion (e.g., the operation portion 312 of FIG. 11) formed adjacent to the support portion, and coupled to the connection member to be pivotable between a first position and a second position. The operation portion may include a fixing portion (e.g., the fixing portion 314 of FIG. 11) in at least part thereof, the fixing portion may be disposed in the first fixing region at the first position and in the second fixing region at the second position, and when an external force is applied to the support portion at the first position, at least part of the operation portion may be movable from the first fixing region to the second fixing region in contact with at least part of the connection member.

According to an embodiment, the connection member may include at least one of urethane, silicone, or rubber.

According to an embodiment, the fixing portion may be formed as at least one protrusion, and the first fixing region and the second fixing region may be formed as concave portions.

According to an embodiment, the connection member may include a contact region (e.g., the contact region 333 of FIG. 11) formed between the first fixing region and the second fixing region, and the fixing portion may be movable from the first fixing region to the second fixing region by being slidingly moved in the contact region.

According to an embodiment, the connection member may include a connection portion (e.g., the connection portion 331 of FIG. 10) to be accommodated in at least part of the cover, and a slide region (e.g., the slide region 334 of FIG. 10) for guiding a movement path of the operation portion, and at least part of the operation portion may be disposed between the connection portion and the slide region.

According to an embodiment, a thickness (e.g., W4 in FIG. 11) of the fixing portion may be formed to be greater than a distance (e.g., W3 in FIG. 10) between the fixing region and the slide region.

According to an embodiment, the electronic device may include a separation prevention region (e.g., the separation prevention region 336 of FIG. 10) disposed side by side with the fixing region, and the separation preventing region may accommodate at least part of the operation portion.

According to an embodiment, the electronic device may further include an elastic member (e.g., the elastic member 350 of FIG. 8), and the elastic member may be disposed to surround at least part of the body.

According to an embodiment, the elastic member may be formed of silicon.

According to an embodiment, the accommodation space may be enabled to accommodate a storage medium (e.g., the storage medium 299 of FIG. 5), and the storage medium may include at least one of a SIM card or an SD card.

According to an embodiment, the connection member may further include a restoration portion (e.g., the restoration portion 538 of FIG. 21) disposed side by side with an operation region, and the restoration portion may be enabled to contact an edge of one side of the support portion.

According to an embodiment, the connection member may include a metal material and be manufactured by a press method.

According to an embodiment, at the second position, at least part of the cover may be enabled to protrude to the outside of the housing.

Each embodiment herein may be used in combination with any other embodiment(s) described herein.

According to various embodiments, a tray insertable into an electronic device may be provided, including: a body (e.g., the body 301 of FIG. 8) including an accommodation space (e.g., the accommodation space 301*a* of FIG. 8) for accommodating a storage medium, and forming an exterior of the tray; a connection member/connector (e.g., the connection member 330 of FIG. 8) disposed at an edge of one side of the body; and a cover (e.g., the cover 310 of FIG. 8) operably coupled to the connection member (or connector). The cover may include: an opening (e.g., the opening 313 of FIG. 11) for accommodating at least part of the connection member/connector; a support portion (e.g., the support portion 311 of FIG. 11); and an operation portion (e.g., the operation portion 312 of FIG. 11) formed adjacent to the support portion and including a protrusion (e.g., the fixing portion 314 of FIG. 11). The connection member/connector may include a first fixing region (e.g., the first fixing region 332*a* of FIG. 10) and a second fixing region (e.g., the second fixing region 332*b* of FIG. 10), formed as at least one concave portion. The protrusion may be located in the first fixing region at a first position of the cover, and when an external force is applied to the support portion, the cover may rotate from the first position to a second position, and the protrusion is moved on at least part of the connection member/connector from the first fixing region to the second fixing region.

According to an embodiment, the connection member/connector may include at least one of urethane, rubber, or silicone.

According to an embodiment, the connection member may include a contact region (e.g., the contact region 333 of FIG. 11) located between the first fixing region and the second fixing region, and the protrusion may be slidingly movable in the contact region.

According to an embodiment, the connection member may be formed side by side with the fixing region, and include a separation prevention region (e.g., the separation prevention region 338 of FIG. 10) for accommodating at least part of the operation portion.

According to an embodiment, the tray may further include an elastic member (e.g., the elastic member 350 of FIG. 8), and the elastic member may be disposed to surround at least part of the body.

According to an embodiment, the elastic member may be formed of silicone.

According to an embodiment, the storage medium may include at least one of a SIM card or an SD card.

While specific embodiments have been described above in the disclosure, it will be apparent to those skilled in the art that many modifications can be made without departing from the scope of the disclosure.

The invention claimed is:

1. An electronic device comprising:

a housing including an opening;

a circuit board disposed at least partially in the housing;

a socket disposed on the circuit board; and a tray configured to be inserted into the socket, wherein the tray includes:

a body including an accommodation space;

a connection member disposed adjacent to the body and including a first fixing region and a second fixing region spaced apart from the first fixing region, wherein the first fixing region and the second fixing region are formed as concave portions in at least part of the connection member; and a cover including a support portion for shielding the opening and an operation portion formed adjacent to the support portion, and coupled to the connection member to be pivotable between a first position and a second position, wherein the cover includes an opening accommodating at least part of the connection member, wherein the operation portion includes a fixing portion in at least part thereof, and wherein the fixing portion comprises at least one protrusion formed on an inner surface of the operation portion and configured to be accommodated in at least one of the concave portions, wherein the fixing portion is disposed in the first fixing region at the first position and in the second fixing region at the second position by movement of the operation portion between the first and second positions, and wherein the tray is configured so that when an external force is applied to the support portion at the first position, at least part of the operation portion is movable from the first fixing region to the second fixing region in contact with at least part of the connection member.

2. The electronic device of claim 1, wherein the connection member includes at least one of urethane, silicone, or rubber.

3. The electronic device of claim 1, wherein the connection member includes a contact region formed between at least the first fixing region and the second fixing region, and wherein the fixing portion is slidingly movable in the contact region from the first fixing region to the second fixing region.

4. The electronic device of claim 1, wherein the connection member includes a connection portion to be accommodated in the opening of the cover, and a slide region for guiding a movement path of the operation portion, and wherein at least part of the operation portion is disposed between the connection portion and the slide region.

5. The electronic device of claim 4, wherein a thickness of the fixing portion is greater than a distance between the fixing region and the slide region.

6. The electronic device of claim 1, comprising a separation prevention region disposed side by side with the fixing region, wherein the separation preventing region is configured to accommodate at least part of the operation portion.

7. The electronic device of claim 1, further comprising an elastic member comprising elastic material, wherein the elastic member is disposed to surround at least part of the body.

8. The electronic device of claim 7, wherein the elastic member is formed of silicon.

9. The electronic device of claim 1, wherein the accommodation space is configured to accommodate a storage medium, and wherein the storage medium includes at least one of a subscriber identification module (SIM) card or a secure digital (SD) card.

10. The electronic device of claim 1, wherein the connection member includes a restoration portion disposed side by side with an operation region, and wherein the restoration portion is configured to contact an edge of one side of the support portion.

11. The electronic device of claim 1, wherein the connection member comprises a metal material.

12. The electronic device of claim 1, wherein at the second position, at least part of the cover is configured to protrude to the outside of the housing.

13. A tray configured to be insertable into an electronic device, the tray comprising:

a body including an accommodation space configured to accommodate a storage medium, and forming at least part of an exterior of the tray;

a connector disposed at an edge of one side of the body; and a cover operably coupled to the connector, wherein the cover includes:

a support portion;

an operation portion formed adjacent to the support portion and including a protrusion; and an opening for accommodating at least part of the connector, wherein the connector includes a first fixing region and a second fixing region, formed as at least one concave portion, wherein the protrusion is at least partially located in the first fixing region at a first position of the cover and is at least partially located in the second fixing region at a second position of the cover by movement of the cover between the first and second positions, and wherein the protrusion is formed on an inner surface of the operation portion and is configured to be accommodated in at least one of the first fixing region and the second fixing region, and wherein the tray is configured so that when an external force is applied to the support portion, the cover can rotate from the first position to a second position, and the protrusion is moves on at least part of the connector from the first fixing region to the second fixing region.

14. The tray of claim 13, wherein the connector includes at least one of urethane, rubber, or silicone.

15. The tray of claim 13, wherein the connector includes a contact region located between at least the first fixing region and the second fixing region, and wherein the protrusion is slidingly movable in the contact region.

16. The tray of claim 13, wherein the connector is formed side by side with the fixing region, and includes a separation prevention region for accommodating at least part of the operation portion.

17. The tray of claim 13, further comprising an elastic member comprising elastic material, wherein the elastic member is disposed to surround at least part of the body.

18. The tray of claim 17, wherein the elastic member comprises silicone.

19. The tray of claim 13, wherein the storage medium includes at least one of a subscriber identification module (SIM) card or a secure digital (SD) card.

* * * * *